United States Patent
Panchaksharaiah et al.

(10) Patent No.: US 12,041,322 B2
(45) Date of Patent: Jul. 16, 2024

(54) SYSTEMS AND METHODS FOR IMPROVING MUSIC PLAYBACK AT A PLAYBACK DEVICE

(71) Applicant: Rovi Guides, Inc., San Jose, CA (US)

(72) Inventors: Vishwas Sharadanagar Panchaksharaiah, Tiptur (IN); Vikram Makam Gupta, Karnataka (IN); Madhusudhan Seetharam, Bangalore (IN); Prateek Varshney, Karnataka (IN); Reda Harb, Bellevue, WA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/545,722

(22) Filed: Dec. 8, 2021

(65) Prior Publication Data
US 2023/0179838 A1    Jun. 8, 2023

(51) Int. Cl.
*H04N 21/431* (2011.01)
*H04N 21/439* (2011.01)
*H04N 21/6587* (2011.01)
*H04N 21/81* (2011.01)
*H04N 21/845* (2011.01)

(52) U.S. Cl.
CPC ..... *H04N 21/8456* (2013.01); *H04N 21/4312* (2013.01); *H04N 21/4394* (2013.01); *H04N 21/6587* (2013.01); *H04N 21/8106* (2013.01)

(58) Field of Classification Search
CPC .......... H04N 21/8456; H04N 21/4312; H04N 21/4394; H04N 21/6587; H04N 21/8106
USPC ....................................................... 386/241
See application file for complete search history.

(56) References Cited

U.S. PATENT DOCUMENTS

| | | | |
|---|---|---|---|
| 4,858,033 A * | 8/1989 | Chippendale | G11B 27/36 386/230 |
| 7,340,759 B1 * | 3/2008 | Rodriguez | H04N 21/47202 348/E5.002 |
| 8,515,337 B2 | 8/2013 | Ingrassia et al. | |
| 11,044,292 B2 * | 6/2021 | Enenkl | H04L 65/75 |
| 11,051,059 B2 * | 6/2021 | Dodson | H04N 21/6543 |
| 11,190,455 B2 * | 11/2021 | Falk | H04L 47/283 |
| 2009/0055377 A1 | 2/2009 | Hedge et al. | |
| 2010/0267331 A1 | 10/2010 | Ingrassia et al. | |
| 2011/0061108 A1 | 3/2011 | Arrasvuori et al. | |

(Continued)

OTHER PUBLICATIONS

Irwin, Collin, et al., "Automatic Switching Between Internet Radio and Traditional Radio", Irwin, Collin and Hausmann, Rachel, "Automatic Switching Between Internet Radio and Traditional Radio", Technical Disclosure Commons, (Jan. 19, 2021).

(Continued)

*Primary Examiner* — Helen Shibru
(74) *Attorney, Agent, or Firm* — Haley Guiliano LLP

(57) ABSTRACT

Systems and methods for improving audio playback at a playback device are described herein. In some embodiments, a system transitions between causing playback of a radio broadcast stream to causing playback of device music, such as in response to determining that a quality of the radio broadcast stream is below a threshold value. In some embodiments, a system selects songs to play based on device preferences of a plurality of different media devices. In some embodiments, a system selects a device from which to retrieve songs for playback based on one or more rules.

17 Claims, 9 Drawing Sheets

(56) References Cited

U.S. PATENT DOCUMENTS

| | | |
|---|---|---|
| 2011/0239142 A1* | 9/2011 | Steeves .................... G06F 3/14 |
| | | 345/3.1 |
| 2012/0129476 A1 | 5/2012 | Whikehart et al. |
| 2012/0203796 A1 | 8/2012 | Abraham et al. |
| 2012/0290648 A1 | 11/2012 | Sharkey |
| 2012/0290738 A1 | 11/2012 | Lau |
| 2014/0079241 A1* | 3/2014 | Chan ................ H04N 21/44218 |
| | | 381/77 |
| 2015/0067871 A1 | 3/2015 | Commons et al. |
| 2016/0328396 A1 | 11/2016 | Rajapakse |
| 2019/0325035 A1 | 10/2019 | Sagui et al. |
| 2023/0176809 A1 | 6/2023 | Panchaksharaiah et al. |

OTHER PUBLICATIONS

PCT/US2022/052268 International Search Report and Written Opinion, dated Apr. 26, 2023, 14 pages.

* cited by examiner

SYSTEMS AND METHODS FOR IMPROVING MUSIC PLAYBACK AT A PLAYBACK DEVICE

BACKGROUND

This disclosure is generally directed to causing music playback at a playback device. In particular, methods and systems are provided for transitioning between a radio broadcast to device music, selecting device music based on preference data from a plurality of devices, and selecting devices based on stored device data.

SUMMARY

Historically, options for music listening were limited to live performances. Music listening options expanded in the $19^{th}$ century with the invention of the phonograph cylinder and again in the $20^{th}$ century with the invention of frequency modulation (FM) broadcasting which allowed music to be broadcast to radio receivers. While modern music storage and streaming allow for even greater access to music, media broadcasts, such as FM broadcasts, are still frequently used, especially in vehicles as they tend to have curated programs that require little user interaction.

One issue with media broadcasting is that the media broadcasts can suffer from interference, poor signal quality, poor sound quality, interruptions, or other events that affect the quality of the delivered music. Another issue with media broadcasting is that the programming continues after the radio has been powered off, such as when a user leaves a car, thereby causing the user to balance being late to an appointment with a desire to finish a really good song. Media broadcasts additionally cannot be altered with trick play options, such as a rewind, pause, or fast forward, thereby forcing users to possibly miss favorite parts of a song due to an external event or be stuck listening to a terrible part of a song until the favorite part begins playing.

To address the aforementioned problem, in one approach, music playback systems in cars sometimes have options to stream music over a network or stream music from a mobile device connected with a short-range connection, such as a wired or Bluetooth connection, which has access to music from device storage or through one or more applications that stream music to the mobile device. While this solution allows a user to better control music playback and to play music with higher signal quality, a user is still unable to enjoy the benefits of the curated programming of the media broadcast. A user could listen to the FM broadcast and switch to streamed or stored, but the switch would interrupt a currently playing song and replace the song with a different song. If the user wishes to listen to the currently playing song, the user would have to find the song in an application or device storage and play the song. Such an activity would be extremely dangerous while driving and would still interrupt the song to restart it.

The lack of curation with streamed music or device music can additionally create issues when multiple people are sharing a space with different music tastes. When a radio station is being played, the decision of what song to play is out of the hands of the listeners. When music is selected from device storage or from a streaming service, a decision must be made about what music to play. With multiple people each having different preferences, finding music that appeases each person can be difficult.

To overcome such deficiencies, methods and systems are described herein for transitioning from an FM broadcast to streaming music from a device. In an embodiment, a media playback device, while playing a media item in a broadcast, identifies a media item accessible by a second device, such as through device storage or an application, such as a music streaming application, and identifies a timestamp to play the media item from the second device based on a current timestamp of the currently playing media item. In some embodiments, the system seamlessly transitions from playing the song from the FM broadcast to playing the same song from the second device by identifying the playback timestamp for transitioning, thereby allowing for a switch to a better-quality version of the song when signal quality drops or when trick-play options are requested.

To overcome the deficiencies of curation, methods and systems are further described for dynamically generating a playlist of music based on preferences from a plurality of devices and/or user profiles. A media system may identify devices within a particular range or connected to the media system and identify device preferences from the devices, such as "liked" songs. Based on the device preferences, the system may generate a playlist that meets the preferences of each device, such as by playing songs that have been "liked" by each device. The system may additionally smartly request music streaming from different devices in order to ensure high quality playback or to reduce issues network or battery issues.

The present disclosure addresses the problems of deficiencies in FM broadcasts by transitioning to streamed music. The present disclosure addresses the problems in the following ways: 1) by identifying a same song on the second device or accessible by the second devices, such as through a music streaming application, and a playback timestamp of the song requested from the second device, thereby seamlessly transitioning such that the playback is not interrupted or negatively impacted; 2) performing transitions in response to poor signal quality, audio quality, or interruptions; 3) performing transitions in response to trick play requests; and 4) generating a playlist based on preferences from a plurality of devices.

DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
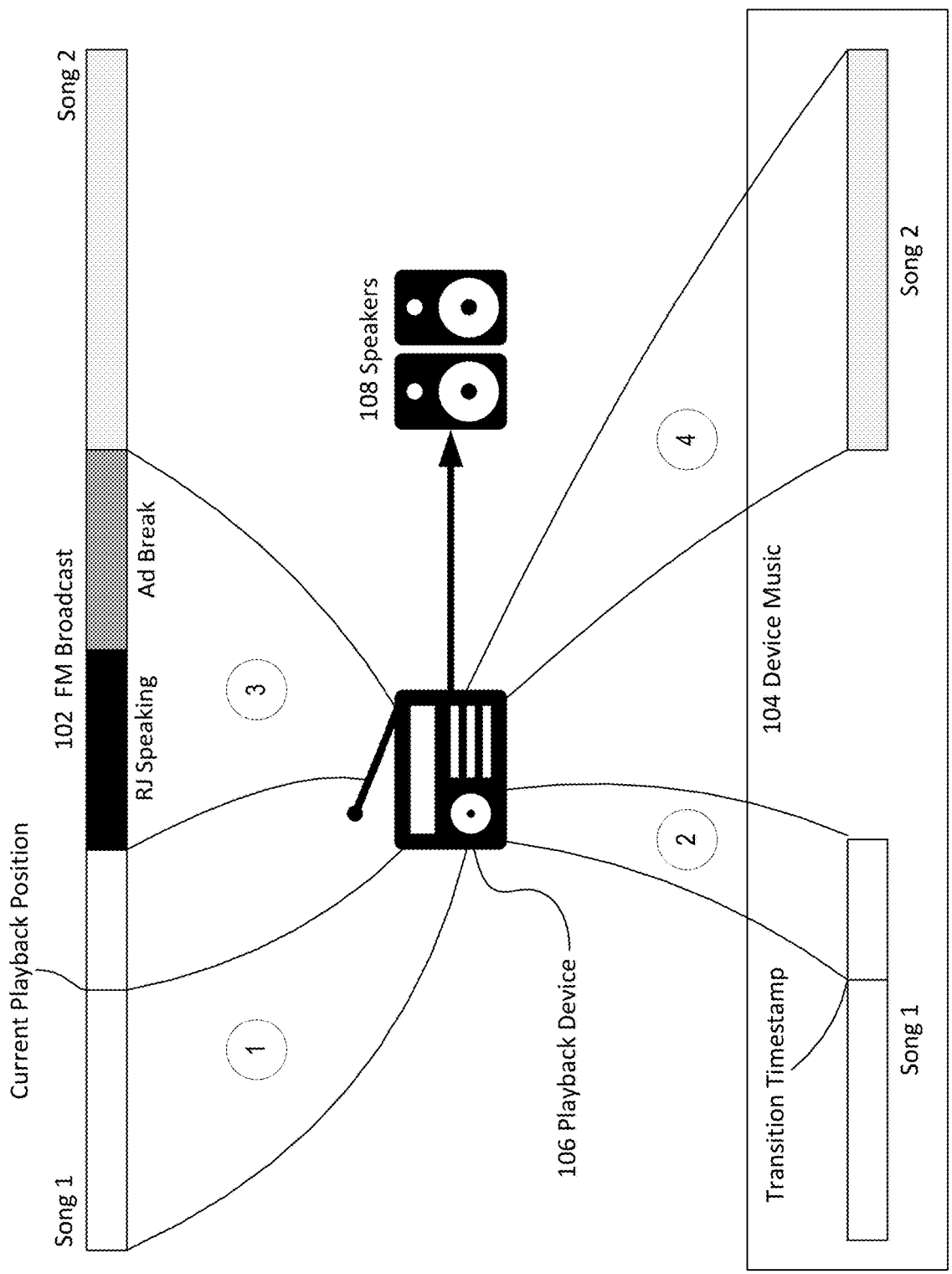
FIG. 1 depicts an example embodiment of transitioning between a radio broadcast and stored device music.

FIG. 1 depicts an example embodiment of transitioning between a radio broadcast and stored device music. FIG. 1 is intended to provide a representative example of a method for synchronizing a radio broadcast with stored device music. Other embodiments discussed further herein may be performed in addition or alternatively to the embodiment of FIG. 1. While the methods described herein are described in reference to "music" and "songs," the same methods may be applied to different types of audio as well as other types of media broadcasts and media items.

In the exemplary embodiment of FIG. 1, a playback device 106 receives a frequency modulation (FM) broadcast 102. The FM broadcast includes a first song (song 1), a period of time where a radio jockey (RJ) is speaking, an advertisement break, and a second song (song 2). The playback device comprises a computing device that is configured to interpret incoming radio signals and transform the incoming radio signals into audio signals. The playback device 106 transmits the audio signals to a speaker system comprising one or more speakers, which output the audio signal corresponding to the FM broadcast 102. A current playback position indicates a position within the song in the FM broadcast 102.

In the exemplary embodiment of FIG. 1, the playback device 106 determines, while causing playback of the FM broadcast, that a transition should be made from the FM broadcast to a different audio source, such as in response to determining that a signal quality of the radio is below a signal quality threshold, determining that an audio quality of the audio output from the FM broadcast is below an audio quality threshold, determining that a request to perform a trick play operation has been received, or in response to other determinations relating to the FM broadcast and/or device music.

In the exemplary embodiment of FIG. 1, the playback device 106 identifies a currently playing song in the FM broadcast. Identifying the currently playing song may include performing an analysis of the audio signal and/or sending the audio signal to an external server configured to identify music from recorded audio, extract song information from metadata received with the FM broadcast signal, and/or extract song information from a song list provided by a station corresponding to the FM signal. The playback device 106 then determines if a user device has access to the identified song. Determining whether the user device has access to the identified song may include determining, based on storage information retrieved from the user device, whether an audio file of the song is stored on the user device. Additionally or alternatively, determining whether the user device has access to the identified song may include determining whether the user device can retrieve the song from an external server, such as through an application installed on the user device. Additionally or alternatively, determining whether the user device has access to the identified song may include determining, based on applications installed on the playback device, whether the playback device can obtain the song from an external server using an account of the user device and/or an application installed on the playback device.

In the exemplary embodiment of FIG. 1, the playback device 106 identifies a playback position of the currently playing song. As discussed above, the current playback position indicates a current position within the song in the FM broadcast 102, such as a timestamp within the song. The playback device may determine the current playback position from an analysis of the audio signal, sending the audio signal to an external server configured to identify a position in the music from recorded audio, metadata that indicates a current position in the song, or from determining a difference between a current time and a time when the song started playing. The time the song started playing may be identified from metadata received with the song or from a song list provided by the station corresponding to the FM signal that identifies start times for songs playing on the radio station.

In the exemplary embodiment of FIG. 1, the playback device 106 uses the identified playback position to determine a transition timestamp in the song. The transition timestamp corresponds to a timestamp in the song where the playback device 106 will start playing the song. In an embodiment, the transition timestamp determines the transition timestamp as a timestamp that matches the current playback position. For instance, if the timestamp of the current playback position is at 2:04:36 into the song, the transition timestamp may be identified as 2:04:36. The playback device 106, in some embodiments, may additionally determine an amount of time it would take to perform a transition between the currently playing song to device music. The determination may be based on stored data indicating how long a transition takes to occur, based on previous measurements of how long a transition takes to occur, and/or based on a current download speed. For instance, if the song is being streamed from a server, the playback device may determine, based on a measured download speed, how long it would take to fill a particular portion of a buffer, such as three seconds of music. The playback device 106 may add the time it takes to transition from the FM broadcast to the device music and add the amount of time to the current playback position to identify the transition timestamp. The determination may additionally or alternatively be based on other types of delays. For example, if a source of the song initially plays an advertisement before allowing playback of the song, the playback device may determine the length of the advertisement and add that length to the current playback position to identify the transition timestamp. In some embodiments, the transition timestamp is selected at one of a plurality of predetermined locations in a song. For example, the playback device may store or otherwise access data identifying timestamps in a song that correspond to a start of the chorus. The playback device may be configured to identify the predetermined location in the song that is closest, but prior, to the current playback position.

In the exemplary embodiment of FIG. 1, the playback device 106 transitions from playing the song in the FM broadcast at the current playback position to playing the song from device music at the transition timestamp. The playback device 106 may retrieve the song from a user device and/or from an external server. The user device may store an audio file of the song in memory and/or retrieve the song from an external server. In an embodiment, the playback device retrieves the song from the user device through a short-range connection, such as a wired or Bluetooth connection. To transition from the FM broadcast to device music, the playback device 106 stops sending the audio signal from the FM broadcast to speakers 108 and starts sending the audio signal from the device music to speakers 108.

In the exemplary embodiment of FIG. 1, the playback device 106 is configured to switch back to the FM broadcast when the song has finished playing. The playback device, starts sending the audio signal from the FM broadcast to speakers 108 when the song finishes playing. The playback device 106 continues to cause playback of the FM broadcast through a period of the radio jockey speaking and an advertisement break.

In the exemplary embodiment of FIG. 1, the playback device 106 is configured to switch back to device music when a new song starts. The playback device may determine that a new song is starting using any of a number of techniques, including analyzing audio of the broadcast until a song is identified, sending audio of the broadcast to an external server to analyze until a song is identified, identifying a song in metadata of the broadcast, or accessing a song list from the station corresponding to the FM signal that identifies songs and start times. When a new song is identified as starting, the playback device may transition to playing the song from device music obtained from the user device or a server computer. In an embodiment, the playback device transitions to the second song in device music automatically. In other embodiments, the playback device transitions to the second song in device music in response to determining that a switch should occur, such as based on audio quality or signal quality.

FIG. 1 provides an exemplary embodiment and is not intended to limit the embodiments described herein. For instance, embodiments may be performed where the FM broadcast is replaced by a broadcast from satellite radio or from an internet stream, such as a streaming service that randomizes music. Such embodiments may be useful when a song that is being transmitted over the internet is available on a user device and an internet connection is weak. Other embodiments may include transitioning to device music to play different songs than what is playing through the broadcast and/or transitioning from playing device music to playing music from the radio based on signal quality. Such embodiments are described further herein.

Figure 2:
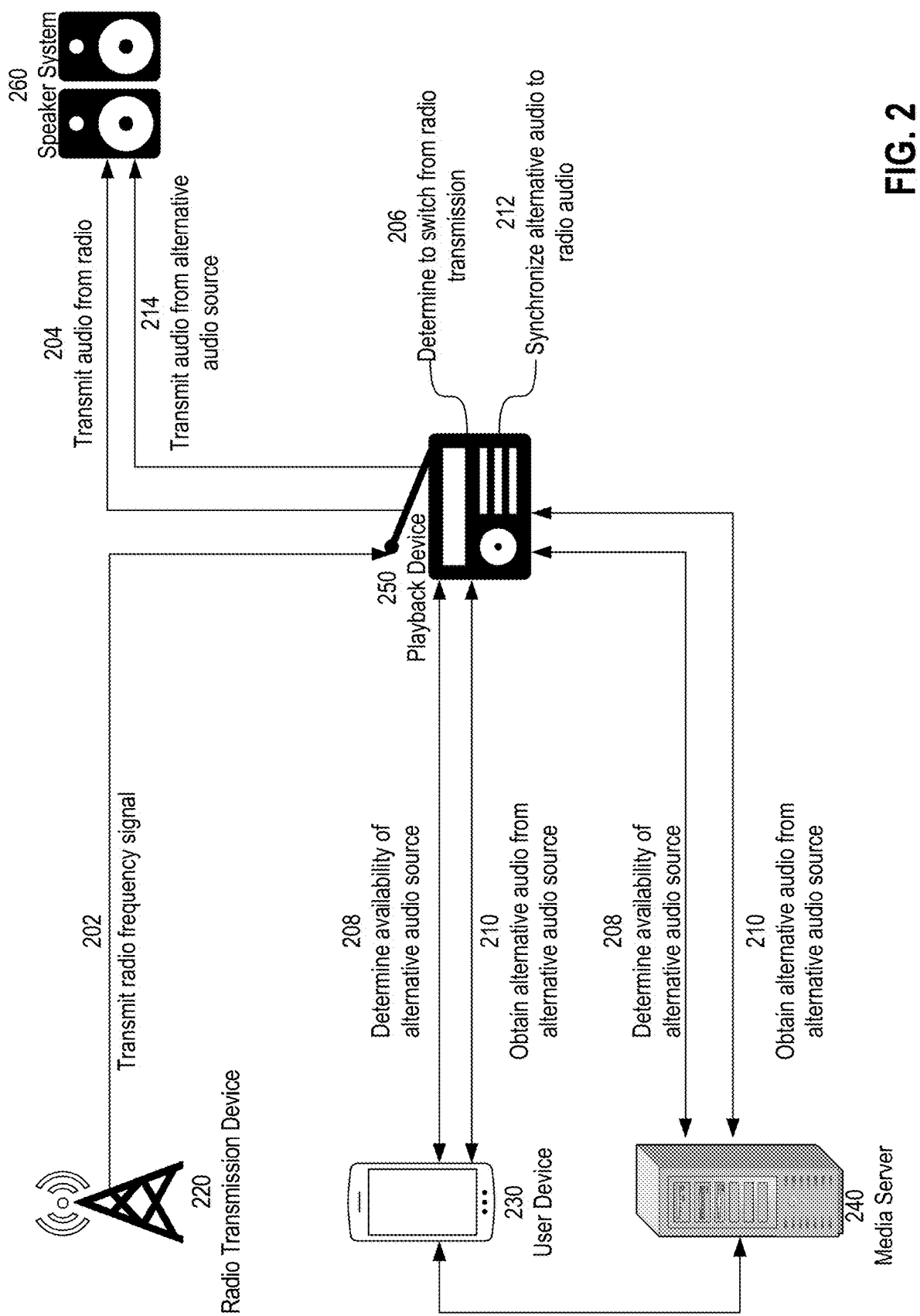
FIG. 2 depicts an example system and method for transitioning between a radio broadcast and device music.
Figure 6:
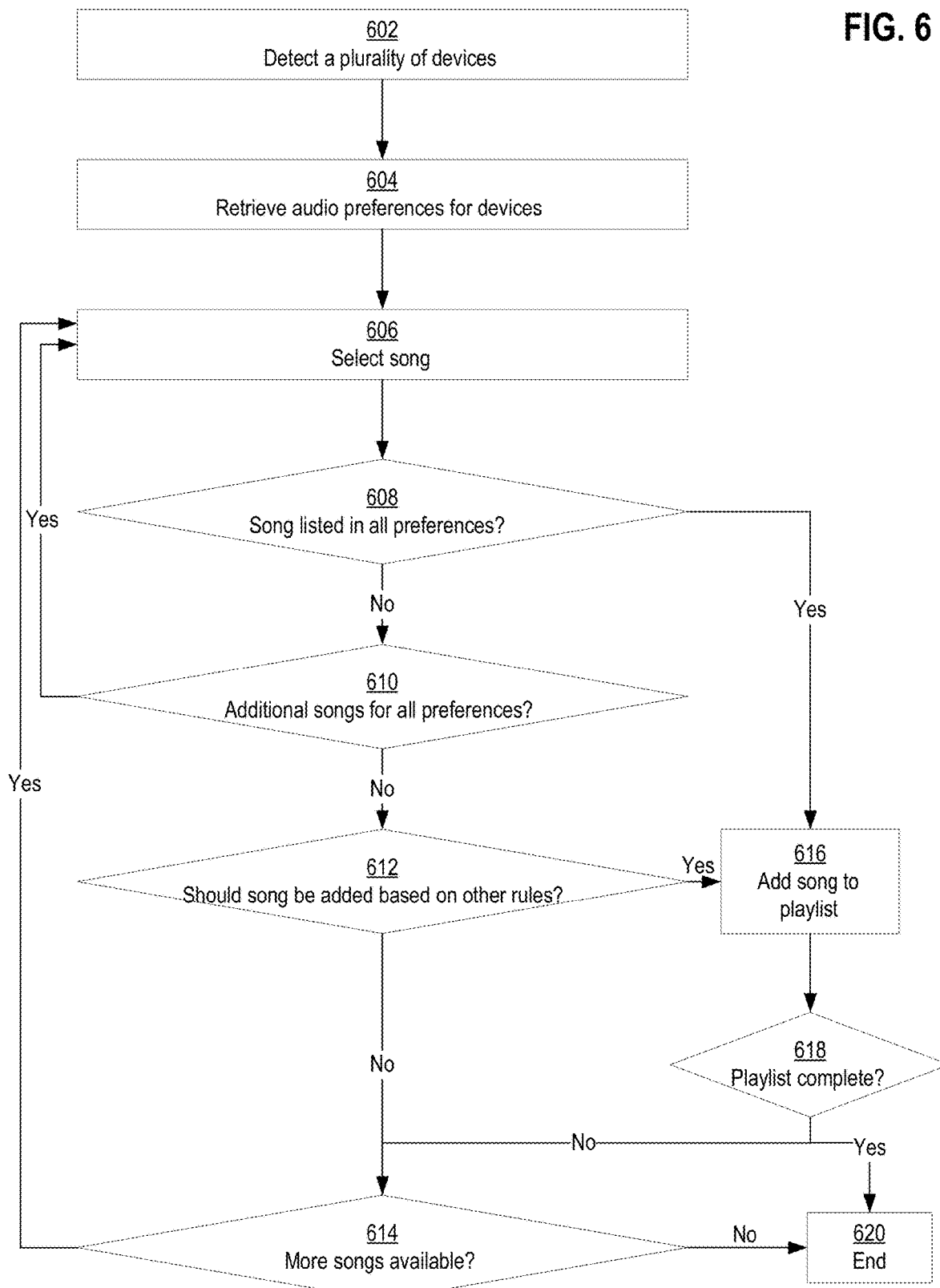
FIG. 6 is a flowchart depicting an example method for generating a playlist based on preferences for a plurality of devices.
Figure 7:
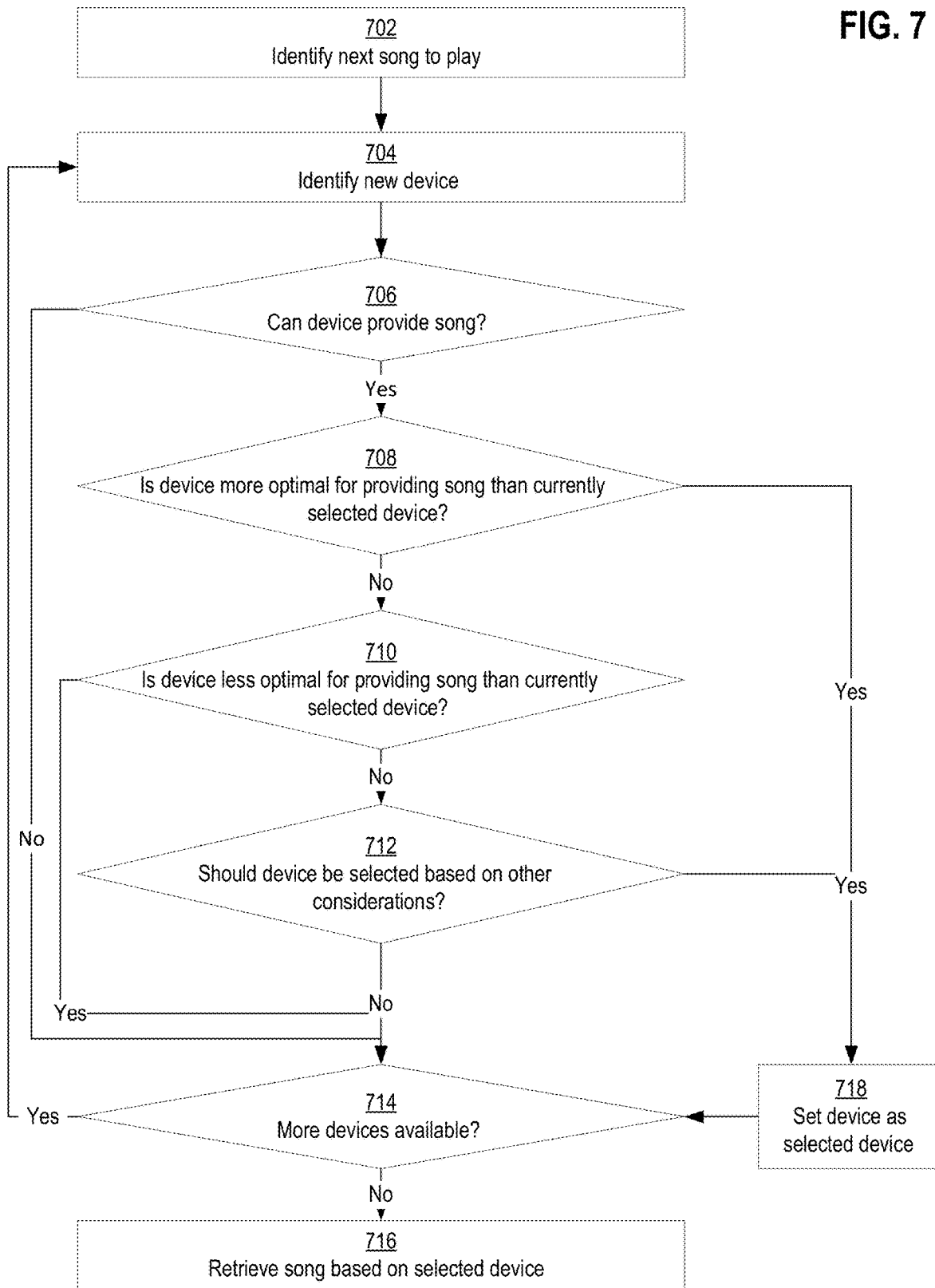
FIG. 7 is a flowchart depicting an example method for selecting a device to play back a song on a playlist.

FIG. 2 depicts an example system and method for transitioning between a radio broadcast and device music. FIGS. 2, 3, 5, 6, and 7 depict practical implementations of methods described herein, but are not intended to limit the methods to a particular order. For instance, determining to switch from a radio transmission in FIGS. 2 and 3 may be performed after determinations of alternative audio sources. As another example, while FIG. 6 and FIG. 7 provide iterative approaches where the system searches through each song or device, other known sorting techniques may be used to identify songs listed in all preferences or detect optimal devices for performing playback based on one or more rules.

FIG. 2 depicts a radio transmission device 220, a user device 230, a media server 240, a playback device 250, and a speaker system 260. The system of FIG. 2 is depicted to provide an exemplary embodiment of a system for transitioning between radio broadcast and device music, and embodiments may be performed with more or fewer devices. For instance, user device 230 and playback device 250 may comprises a same device which receives the radio transmission from radio transmission device 220, switches to providing music from storage of user device 230 or a media server 240, and transmits audio to speaker system 260 which may be connected to user device 230 through a wired or wireless connection or, in some embodiments, may be incorporated into user device 230, such as through a smart phone's speaker system. Other embodiments may include no user device 230 and/or no media server 240. For instance, playback device 250 may communicate solely with a user device to retrieve music stored on the user device, solely with a media server to obtain music from the media server, or solely with storage of the playback device, which includes one or more audio files.

Radio transmission device 220 may comprise any communication device configured to transmit audio data to playback device 250. In an embodiment, radio transmission device 220 comprises a radio transmitter configured to transform electric power into a radio frequency that is radiated from an antenna. In other embodiments, radio transmission device 220 comprises a server computer configured to provide audio data over a wireless network.

User device 230 may comprise one or more communication devices configured to communicate with playback device 250, such as through a wired or wireless connection. User device 230 may comprise a smartphone, laptop computer, tablet, personal digital assistant (PDA), handheld gaming system, or other mobile computing system. User device 230 may be configured to store audio files in device storage and/or retrieve audio files over a network from a media server 240.

Media server 240 comprises one or more computing systems configured to provide audio files over a network to one or more devices, such as user device 230 or playback device 250. Media server 240 may additionally provide one or more applications to user device 230 and/or playback device 250 and an application programming interface (API) through which user device 230 and/or playback device 250 may request transmission of media. In an embodiment, media server 240 authenticates requests for music based on an account identifier of a user that indicates whether the user has access to particular songs. For instance, a stored user profile may indicate that the user has permission to access any song, permission to access only particular songs, and/or permission to access songs under different types of restrictions, such as quality restrictions or requirements to watch or listen to advertising. Playback device 250 comprises a computing device configured to receive audio data from radio transmission device 220. Playback device 250 may comprise a radio receiver configured to receive radio waves and convert the radio waves into audio signals which can then be provided to speakers 260. In an embodiment, playback device 250 is additionally configured to communicate with user device 230, such as through a wired or wireless connection, and/or media server 240, such as through a Wi-Fi connection.

Speaker system 260 comprises one or more electroacoustic transducers configured to transform an electrical audio signal into a corresponding sound. Speaker system 260 is communicatively coupled to playback device 250 through a wired or wireless connection, such as a Bluetooth connection or wireless internet connection. Additionally or alternatively, speaker system 260 may comprise one or more speakers of playback device 250, such as speakers of a smartphone.

At step 202, radio transmission device 220 transmits a radio frequency signal to playback device 250. For example, a radio tower or a server computer may transmit audio signals such as radio signals or data packets sent over a communications network that the playback device 250 is configured to receive. Transmission of the signal to the playback device 250 in some embodiments is not targeted. For instance, with a transmission of radio frequency signals, the radio transmission device 220 does not establish a connection to the playback device 250 but instead transmits the signal to the playback device 250 by generally transmitting the signal which the playback device 250 is configured to receive through an antenna.

At step 204, playback device 250 transmits an audio signal from the radio broadcast to speaker system 260. For example, playback device 250 may convert the radio frequency signal to an audio signal for playback by the speaker system 260. Additionally or alternatively, the playback device 250 may send an unchanged radio frequency signal to the speaker system 260 which translates the radio frequency signal into an audio output.

At step 206, playback device 250 determines to switch from radio transmission. For example, the playback device 250 may access one or more stored rules that indicate that a switch from radio transmission is to occur based on one or more events. Playback device 250 may be configured to monitor for the one or more events to determine whether to switch from radio transmission. In some embodiments, the one or more events comprise a request from an external system for the playback device 250 to switch from the radio transmission. For example, a server computer may make a determination that a switch should occur using the methods described further herein and send a request to the playback device 250 to switch from the radio transmission in response to the determination.

In some embodiments, the one or more events comprise a determination relating to a monitored signal quality of the radio frequency broadcast. For example, the playback device 250 may measure a received signal strength or a signal-to-noise ratio of the received broadcast. The playback device 250 may store threshold values for a received signal strength indication (RSSI) measurement and/or signal-to-noise ratio. If the measured RSSI is below the RSSI threshold or the signal-to-noise ratio is above the signal-to-noise threshold, the playback device 250 may determine that a switch should be made from the radio transmission.

In some embodiments, the one or more events comprise a determination relating to an audio quality from the radio frequency broadcast. For example, the playback device 250 may be communicatively coupled to a sound recording device, such as a microphone, which receives the audio output from the speaker system 260 as audio input. The playback device 250 may store an audio quality threshold and may determine whether the audio quality measured from the audio input captured by the sound recording device is below the audio quality threshold. If the measured audio quality is below the audio quality threshold, the system may determine that a switch should be made from the radio transmission.

In some embodiments, the one or more events comprise a determination relating to an audio file quality of the song provided through the radio frequency broadcast. The audio file quality of the song provided through the radio frequency broadcast may be determined based on metadata received with the broadcast that indicates a file type of the song file. Additionally or alternatively, the file quality of the song may be presumed based on a type of broadcast. For example, playback device 250 may store data indicating file types and/or file qualities that are presumed to be better than an FM broadcast, such as M4A or MP3 files with bitrates higher than a stored threshold value. Thus, if an alternative audio source has access to a version of the file that is determined to be better than the presumed FM broadcast based on the stored data, the playback device 250 may determine that a switch should be made from the radio transmission.

In some embodiments, the one or more events comprise a detection of the start of a song. For example, the playback device 250 may be configured to determine that a switch should be made from the radio transmission each time a new song starts. Additionally or alternatively, the one or more events may comprise a determination that alternative audio is available from an alternative audio source, such as through step 208. Thus, the playback device 250 may be configured to switch from the radio transmission each time a new song begins playing for which an alternative audio is available, thereby ensuring that high-quality music is provided for each instance where it is possible. The determination that alternative audio is available is described further in step 208.

In some embodiments, the one or more events comprise a request to perform a trick play operation. For example, the playback device may cause display of a graphical user interface which includes trick play options, such as pause, rewind, and fast-forward. These trick play options may be displayed while the playback device 250 is causing playback of audio from a radio transmission, which generally cannot be affected by trick play options. In response to a selection of a trick play option, the playback device 250 may determine that a switch should be made from the radio transmission. Once the switch is made, the playback device 250 may perform the action of the selected trick play option, such as rewinding the song, pausing the song, or fast-forwarding the song.

At step 208, playback device 250 determines availability of an alternative audio source. FIG. 2 depicts two implementations for determining availability of an alternative audio source, one where the playback device 250 determines the availability based on data obtained from user device 230 and one where the playback device 250 determines the availability based on data obtained from media server 240. The two implementations of step 208 in FIG. 2 may be performed exclusively or in combination. For example, the playback device 250 may be configured to request data indicating availability of music from one or more user devices 230 exclusively, from a media server 240 exclusively, or from both the one or more user devices 230 and the media server 240.

In some embodiments, playback device 250 determines whether the file is stored on one or more user devices 230. For example, playback device 250 may send a request to one or more user devices 230 for data indicating which songs are stored on the user devices. The playback device 250 may determine whether the currently playing song is identified in the data received from the one or more user devices 230. Additionally or alternatively, the playback device 250 may send a request for the one or more user devices 230 to determine whether the one or more devices 230 are storing the currently playing song.

In some embodiments, playback device 250 determines whether the one or more user devices 230 have access to the currently playing song through one or more applications. For example, a user device 230 may store one or more media applications through which a media server provides music. The playback device 250 may send a request to the user device 230 to provide application data identifying one or more applications that are executing on the user device 230. The playback device 250 may identify the one or more applications and send a request to the user device to determine whether the song can be requested through the one or more applications, such as by performing a query for song availability of the currently playing song. Additionally or alternatively, the playback device 250 may interact directly with the one or more applications on the user device 230 through an API of the one or more applications and cause the user device 230 to send the query to the media server 240 for song availability.

The request to the user device 230 to provide application data may include a request that is displayed on the user device 230 to accept the sharing of music preferences with the playback device 250. If the user device 230 receives input accepting the sharing of music preferences, the user device 230 may share a unique key, generated by the user device 230 or retrieved from the server 240 by the user device 230, corresponding to a media application installed on the user device 230. The playback device 250 may retrieve music preferences through an API call to the media server 240 made by the playback device 250 and/or the user device 230 that includes the unique key.

In some embodiments, playback device 250 determines whether the currently playing song can be obtained from the media server 240. For example, the playback device 250 may store authentication for a user profile for one or more media applications. The playback device 250 may be configured to communicate with the media server 240 that corresponds to the one or more media applications. The playback device 250 may provide the authentication information to the media server 240 and send a query to the media server 240 for song availability of the currently playing song. Additionally or alternatively, the playback device 250 may send a query to the media server 240 without authentication of a user profile. For example, if a media server 240 provides some music without requiring authentication, the playback device 250 may send a request to the media server for the currently playing song.

While FIG. 2 depicts step 206 occurring prior to step 208, in some embodiments the order is reversed or the steps are simultaneous. For example, the playback device 250 may determine whether to perform the switch from the radio transmission at least partially in response to determining that the song is available from a different audio source. Additionally or alternatively, the playback device 250 may be configured to determine whether to perform the switch from the radio transmission based, at least in part, on a manner in which the song is available from a different audio source. For example, if the song is available only for a price or requires advertisements to be played in the middle of the song, the playback device 250 may determine that a switch from the radio transmission should not be performed. Similarly, if the song is available only from a user device that has a battery level lower than a threshold level, the playback device 250 may determine a switch from the radio transmission should not occur.

At step 210, playback device 250 obtains alternative audio from the alternative audio source. FIG. 2 depicts two implementations for obtaining alternative audio from the alternative audio source, one where the playback device 250 receives the alternative audio from user device 230 and one where the playback device 250 receives the alternative audio from media server 240. The two implementations of step 210 in FIG. 2 may be performed exclusively or in combination. Additionally, either of the implementations may be performed with either of the implementations of step 208. For example, playback device 250 may determine from the media server 240 that media device 230 has purchased a license to a particular song through an application provided by media server and may additionally obtain the particular song from the user device 230 that stores the song or obtains the song from media server 240. As another example, playback device 250 may determine, based on application data received from user device 230, that user device 230 is authorized to obtain music from media server 240 through an application provided by media server 240 and may additionally obtain the particular song from the media server 240 using credentials obtained from user device 230.

For example, playback device 250 may request the user device 230 or the media server 240 to send the song to the playback device 250. In an embodiment, if the playback device 250 determines that the playback device 250 can obtain the song from multiple sources, the playback device 250 selects a source from which to obtain the song. For example, if multiple devices have access to the song, the playback device 250 may execute the method of FIG. 7 to identify the device from which to obtain the song. Additionally, if playback device 250 determines that the song may be requested from a device or from a media server, playback device may request from the option with the highest song quality, the best connection, the fewest restrictions, or the option that reduces data or battery usage.

At step 212, the playback device 250 synchronizes the alternative audio to the radio audio. For example, playback device 250 may select a transition timestamp of the retrieved song and cause playback at the transition timestamp. In some embodiments, the transition timestamp is selected to cause a smooth transition from the FM broadcast to the retrieved song, such as by using the methods described herein. The playback device 250 may additionally determine a time to end the currently playing FM broadcast. For example, if the playback device 250 determines that it will take five seconds to obtain and queue up the song from the alternative audio source, the playback device 250 may select the time to end the currently playing FM broadcast as five seconds from a current time.

At step 214, the playback device 250 transmits audio from the alternative audio source to speaker system 260. For example, the playback device 250 may transform the retrieved audio file into an audio signal that can be output by the speaker system 260 and transmit the audio signal to the speaker system. Additionally or alternatively, the playback device 250 may send the file directly to the speaker system, which performs the transformation to an audio signal and produces the audio output.

Figure 3:
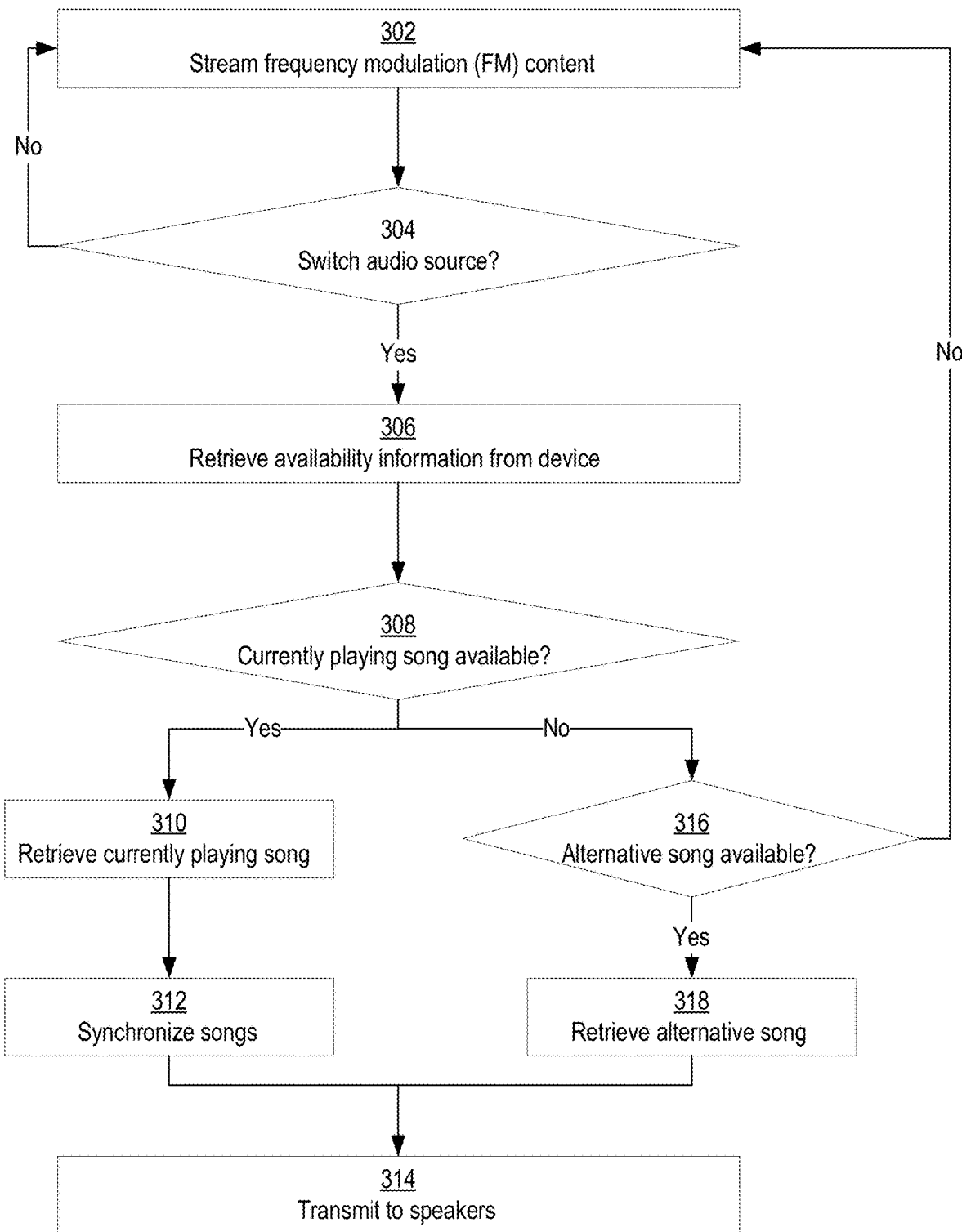
FIG. 3 is a flowchart depicting an example method for transitioning between a radio broadcast and device music.

FIG. 3 is a flowchart depicting an example method for transitioning between a radio broadcast and device music. FIG. 3 is intended to provide a representative example of a method for synchronizing a radio broadcast with stored device music. Other embodiments discussed further herein may be performed in addition or alternatively to the embodiment of FIG. 3. For example, the playback device may select a device from which to retrieve the song using the method of FIG. 7.

At step 302, input/output circuitry of a playback device streams frequency modulation (FM) content from a radio transmission device. For example, an antenna may receive a radio signal, which is then processed by the input/output circuitry of the playback device. The input/output circuitry of the playback device may then send the processed signal to a speaker system to cause playback of the FM content.

At step 304, control circuitry of the playback device determines whether to switch the audio source. For example, control circuitry of the playback device may determine whether to switch from a currently playing song to a version of the currently playing song stored by a client device or media server, or accessible to the client device or media server, using the techniques described previously herein. If the control circuitry determines to not switch the audio source, then the process returns to step 302 and input/output circuitry of the playback device continues to stream the FM content from the radio transmission device.

If the control circuitry of the playback device determines to switch the audio source, the process proceeds to step 306. At step 306, input/output circuitry of the playback device retrieves availability information from the device. For example, input/output circuitry may send a request to the device to determine whether the device has access to the currently playing song, such as through device storage or through external storage, such as a media server that provides media to the user device through a media application. As another example, the input/output circuitry may request a list of songs to which the user device has access, such as through device storage or through external storage, such as a media server which provides media to the user device through a media application. Additionally or alternatively, the playback device may access stored data to determine availability information from the device. For example, the playback device may initially request data indicating to which songs a user device has access and store the data indicating to which songs the user device has access. Additionally or alternatively, the playback device may obtain availability information from a media server which provides the song directly to the playback device or to the user device.

At step 308, control circuitry of the playback device determines if a currently playing song in the FM broadcast is available. For example, the control circuitry of the playback device may identify a currently playing song through known audio recognition techniques or based on metadata retrieved with the song or a song listing for a radio station that is providing the song. The control circuitry of the playback device may compare the identified song to the availability information to determine whether the user device has access to the currently playing song. As noted with respect to FIG. 2, steps 304-308 may be performed in any order and, in some embodiments, determining if the currently playing song is available is a basis, at least in part, for determining that a switch should occur.

If control circuitry of the playback device determines that the currently playing song is not available, the process proceeds to step 316, which is described further herein. If control circuitry of the playback device determines the currently playing song is available, the process proceeds to step 310. At step 310 input/output circuitry retrieves the currently playing song. For example, the input/output circuitry may send a request to the user device to send the song to the playback device over a wired or wireless connection. In some embodiments, the request includes a request to retrieve the song from an external server, such as a media server.

At step 312, control circuitry of the playback device synchronizes the retrieved song with the currently playing song from the radio broadcast. For example, control circuitry of the playback device may identify a timestamp in the currently playing song where playback of the FM broadcast will end and identify a corresponding timestamp in the song retrieved in step 310. The corresponding timestamp may be selected such that a smooth transition occurs from the FM broadcast, such as using the methods described herein. Additionally or alternatively, the corresponding timestamp may comprise a pre-selected timestamp for the song, such as a previous or next chorus.

At step 314, the input/output circuitry of the playback device transmits an audio signal of the retrieved song to the speaker system. For example, the input/output circuitry may stop sending the audio signal to the speaker system or otherwise stop the playback of the FM content. The input/output circuitry may send an audio signal to the speaker system generated from the audio file retrieved from the device and/or server computer to cause playback of the song.

At step 316, in response to determining that the currently playing song is not available in step 308, control circuitry of the playback device determines if an alternative song is available. In some embodiments, if the currently playing song is not available in step 308, the process returns to step 302. In the embodiment of FIG. 3, the playback device seeks an alternative song for the transition. For example, the playback device may determine one or more attributes of the currently playing song, such as artist, album, genre, or decade, and use the attributes of the currently playing song to find an alternative song. The playback device may give priority to songs from a same album, followed by songs from a same artist, followed by songs from a same genre, followed by songs from a same decade. Additionally or alternatively, the playback device may give priority to popular songs or songs that are more frequently played on the user device. For example, the playback device may be configured to prioritize a most popular song by the same artist or a most listened-to song for the user device by the same artist. Alternative methods may identify songs with similar musical structures using known musical comparison methods.

If an alternative song is not available, then the process returns to step 302, and input/output circuitry of the playback device continues to stream the FM content from the radio transmission device. For example, the playback device may be configured to only accept some songs as alternatives, such as songs by the same artist. If no alternatives are available that meet specified criteria, the playback device may be configured to continue to stream the FM content until another song is identified.

If control circuitry of the playback device determines that an alternative song is available, the process proceeds to step 318. At step 318, the input/output circuitry retrieves the alternative song, such as by using the same methods as for step 310. After control circuitry of the playback device retrieves the alternative song, the process proceeds to step 314 as described previously herein. Additionally or alternatively, the control circuitry may perform synchronization prior to switching the songs, such as by selecting a timestamp to start the alternative song that would cause playback of the alternative song to end at a same time as playback of the currently playing song would have ended in the FM broadcast.

FIGS. 1-3 depict specific examples of switching between an FM broadcast and music accessible by a device. Other embodiments of smart switching between an FM broadcast and music accessible by a device are described below.

In an embodiment, a switch between an FM broadcast and music accessible by a device is performed in response to the starting and stopping of speaker playback, such as through signal loss or a car being turned off when it reaches its destination. The playback device may determine that playback has stopped, such as in response to a car being powered off. The playback device may identify a song that was playing on the radio when the playback stopped, such as by using any of the techniques described herein. In some embodiments, the playback device continuously detects a playing song and a timestamp of the playing song. In other embodiments, the playback device stores music that is being played back in a first-in-first-out (FIFO) buffer such that a song can be detected based on the last few seconds of the song that were being played when the playback stopped. The playback device may identify the song that was playing and determine whether a user device or media server has access to the song. The playback device may retrieve the song from the user device or media server and synchronize playback of the song when music playback through the speakers is determined to resume, such as when a car turns back on. Synchronizing the playback may comprise selecting a timestamp for starting the song which corresponds to a timestamp of the song when playback stopped, such that the song picks up where it left off when the playback stopped.

In an embodiment, a switch between an FM broadcast and music accessible by a device is performed to ensure playback of a particular song prior to a stopping of speaker playback. For example, a playback device may predict when a car trip will end, such as through a mapping application that predicts when a car will reach its destination. The playback device may additionally determine when a song is scheduled to play through the FM broadcast, such as through a broadcast listing or through linguistic analysis of a radio jockey's words. The playback device may determine whether the song scheduled to play through the FM broadcast will play or finish playing prior to a destination being reached. If the playback device determines that the song will not play or finish playing prior to the destination being reached, the playback device may determine availability of the song from the user device or media server, retrieve the song, and cause playback of the song such that the song will be played or finished playing prior to the user reaching the destination. In an embodiment, this method is performed at least partially in response to determining that the upcoming song is of interest to a user of the device, such as based on previous listening history and/or song popularity.

In an embodiment, the playback device switches from playback from the user device or from the media server to the FM broadcast. For example, the playback device may perform a switch in response to determining that a signal or audio quality is below a threshold value, in response to determining that a battery level of a user device is below a threshold value, or in response to an explicit request to switch to the FM broadcast. In an embodiment, the playback device searches for a station that is playing a song similar to a currently playing song from the user device or media server, such as a song from a same album, artist, genre, or decade. The search may comprise retrieving metadata for a plurality of FM broadcasts at different frequencies to identify currently playing songs and/or retrieving the FM signal and analyzing audio of the FM signal to identify currently playing songs. Additionally or alternatively, the playback device may be configured to search through pre-identified radio stations, such as radio stations that are frequently played or have been identified as favorites of a user of the playback device. In some embodiments, the playback device determines which of the stations are currently playing music and switches to one of the identified stations. Additionally or alternatively, the playback device may determine which of the stations are playing music similar to a currently playing song, or music of a user's preferences or similar to a user's preferences, and switches to the identified radio station. In an embodiment, the switching from playback of music from the user device to the FM broadcast is performed in connection with FIGS. 4 and/or 5, such as in response to a determination that the devices providing playback have poor signal quality.

In an embodiment, a switch between an FM broadcast and music accessible by a device is performed in response to determining that, at a start of playback, a song is currently in the middle of playing. For example, when a car turns on, the playback device may identify a song that is already playing on a radio station. The playback device may determine if the song is accessible to a user device or server computer, retrieve the song, and start playback of the song at a beginning of the song. When the song finishes playing, the playback device may switch back to the FM broadcast. Additionally or alternatively, if, after the song finishes playing, the playback device determines that a new song is currently playing on the radio station, the playback device may identify the new song, determine if the new song is accessible to the user device or media server, retrieve the new song, and start playback of the new song at a beginning of the new song.

In an embodiment, the playback device transitions from playing music from the radio to playing music from a particular playlist of music. For example, the playback device may transition to playing music from a playback queue corresponding to a user device. Additionally or alternatively, the playback device may switch to playing music from a curated playlist, such as the playlist created in FIGS. 4 and 5.

Figure 4:
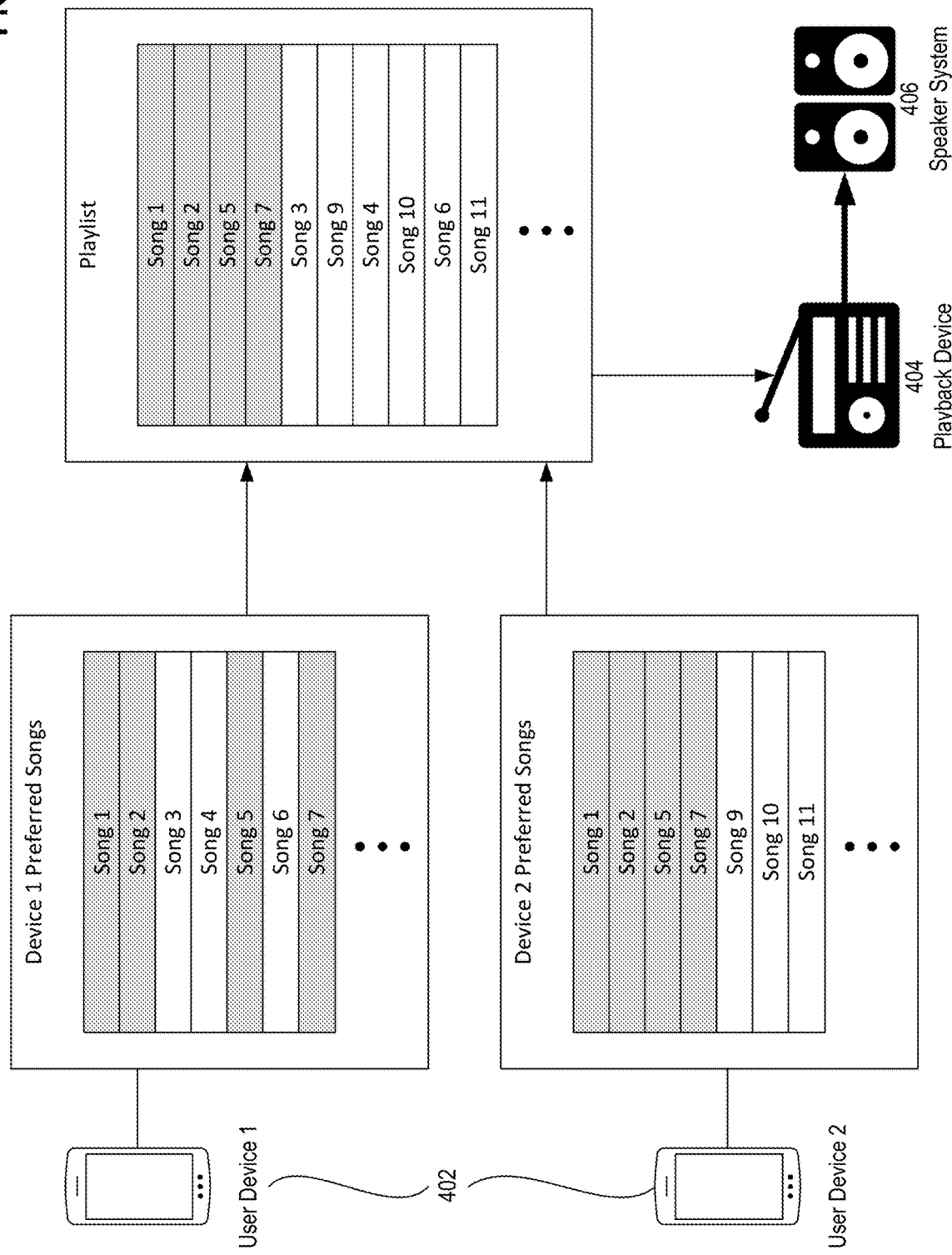
FIG. 4 depicts an example embodiment of generating a playlist based on preferences from a plurality of devices.

FIG. 4 depicts an example embodiment of generating a playlist based on preferences from a plurality of devices. The embodiments depicted in FIGS. 4-7 may be performed in combination with the embodiments depicted in FIGS. 1-3. For example, the curated playlist of FIGS. 4-6 may be used to select a song to which to transition from a currently playing radio broadcast. As another example, the playback device selection of FIG. 7 may be used to determine which device to use of a plurality of devices as the alternative audio source. Additionally or alternatively, the embodiments depicted in FIGS. 4-7 may be separate implementations, such as for generating a music playlist for a rideshare or for a group event, such as a road trip or barbecue, or for selecting devices for playback in a group event.

In the exemplary embodiment of FIG. 4, a playback device 404 generates a playlist based on music preferences corresponding to a plurality of devices 402. The playback device causes playback of the songs in an order determined by the playlist through transmission of an audio signal to speaker system 406. In some embodiments, music preferences for a plurality of devices are used to generate a temporary profile. Music recommendations can be generated based on the temporary profile using known music recommendation techniques, such as through a media server.

In the exemplary embodiment of FIG. 4, playback device 404 retrieves song preferences for the plurality of devices. Song preferences may be determined based on songs stored in storage of the plurality of devices, songs that have been listened to more than a threshold number of times on the plurality of devices, songs that have been listened to within a threshold period of time on the plurality of devices, or songs that have been identified as being liked by users of the plurality of devices, such as through a media application. The playback device may retrieve song preferences directly from the plurality of devices 402, such as by requesting data identifying songs stored on the devices or identifying previous interactions with a stored application indicating music preferences of a user of the user device, such as a selection of an option to specify that a song provided through the application is "liked" by the user. Additionally or alternatively, the music preferences may be retrieved from an external device, such as a media server that provides an application to the user device through which the user device indicates preferences.

In some embodiments, the song preferences of the user device comprise a playlist generated through user input. For example, a user of the user device may select songs to add to a playlist through an application executing on the user device. The songs may comprise songs stored on the user device, songs that the user device is capable of accessing, or songs that the playback device is capable of accessing. The playback device may retrieve data identifying the songs added to the playlist to determine the preferences of the user device. In some embodiments, the user input specifying songs for the playlist is used in combination with other methods of determining preferences. For example, device preferences for a first device may be determined based on historical usage or data requested from a media server. If a second device receives input denying a sharing of device preferences, the second device may display options for adding songs to the playlist directly from stored music and/or from a media application, such as in time slots pre-allocated for the second device.

In the exemplary embodiment of FIG. 4, playback device 404 generates a playlist of songs based on the song preferences of the plurality of user devices by initially selecting songs listed in all of the preferences. For example, in FIG. 4, both the device 1 preferred songs and the device 2 preferred songs include songs 1, 2, 5, and 7. Thus, the playlist initially includes those overlapping songs. In some embodiments, the playback device may be configured to prioritize songs listed in all preferences based on a determined level of preference. For example, the playback device may determine that a song that has been listened to five times has a stronger preference than a song listened to once. If one of the devices has a stronger preference on one of the songs, the song may be moved to a higher spot on the playlist than a song for which neither of the devices has a strong preference. Thus, if both devices store a first song that is rarely played on either device and a second song that is frequently played on one of the devices, the playback device may select the second song to be played on the playlist before the first song.

In the exemplary embodiment of FIG. 4, playback device 404 adds additional songs to the playlist based on one or more rules. As an example, playback device 404 may be configured to switch between songs from device 1 preferred songs and device 2 preferred songs. Thus, in the example of FIG. 4, the next song played after the songs listed in all preferences is song 3 from device 1 preferred songs followed by song 9 from device 2 preferred songs and so on, switching back and forth between the preferences of the devices. In some embodiments, the playback device may be configured to prioritize songs from the individual preferences based on a determined level of preference for the devices. For example, after the songs listed in all preferences are added to the playlist, the playback device may identify a song of device 1 with a highest preference and select the identified song. If multiple songs have a highest preference, the playback device may select one randomly or pseudo-randomly from the multiple songs. In some embodiments, the playback device determines that a song should not be selected if one of the devices has a negative preference towards that song. For example, if, through a media application, a user of device 2 had indicated a dislike for song 3, the playback device 404 may skip adding song 3 to the playlist. Other rules for selecting songs to add to the playlist are described further herein.

In the exemplary embodiment of FIG. 4, playback device 404 is configured to cause playback of the songs in the playlist in the playlist order. For example, playback device 404 may retrieve audio data for the songs from one or more of the user devices, from an external server such as a media server, or from storage of or external to playback device 404. Playback device 404 may send an audio signal to the speaker system 406 to cause playback of the songs.

In an embodiment, playback device 404 and/or an external server provides a graphical user interface to the user devices. The graphical user interface may identify a currently playing song and provide one or more options relating to the currently playing song, such as an option to add the song to the device's preferences, indicate a dislike of the song, or request the currently playing song be skipped. In an embodiment, if a request to skip the currently playing song is received from a first device, an option may be displayed through the graphical user interface on one or more of the other devices to allow the song to be skipped. In an embodiment, if a song is skipped, the playback device selects a different song to replace the song, such as a song listed in preferences of the device from which the initial song was selected. The graphical user interface may additionally provide options for selecting songs to add to the playlist or selecting songs to remove from the playlist for the device from which the song was selected.

In embodiments described herein, a media server provides preference data, music availability data, and/or music for playback. In some embodiments, the media server corresponds to a particular music content provider that has access to preference data for each device, and/or music availability data for each device, and/or provides music for each device. In some embodiments, a plurality of different media servers corresponding to different music content providers perform one or more of the steps described above. For example, if a first device executes a first application for media content that is provided by a first media server, and a second device executes a second application for media content that is provided by a second media server, the playback device may retrieve preferences from the devices and/or the different media servers and/or retrieve the music for playback from the devices and/or different media servers using the methods described herein. Thus, in some embodiments, the playback device causes playback of songs retrieved from different media servers that provide different applications and transitions between the different media servers providing the songs based on song availability and/or preference source as described herein.

Figure 5:
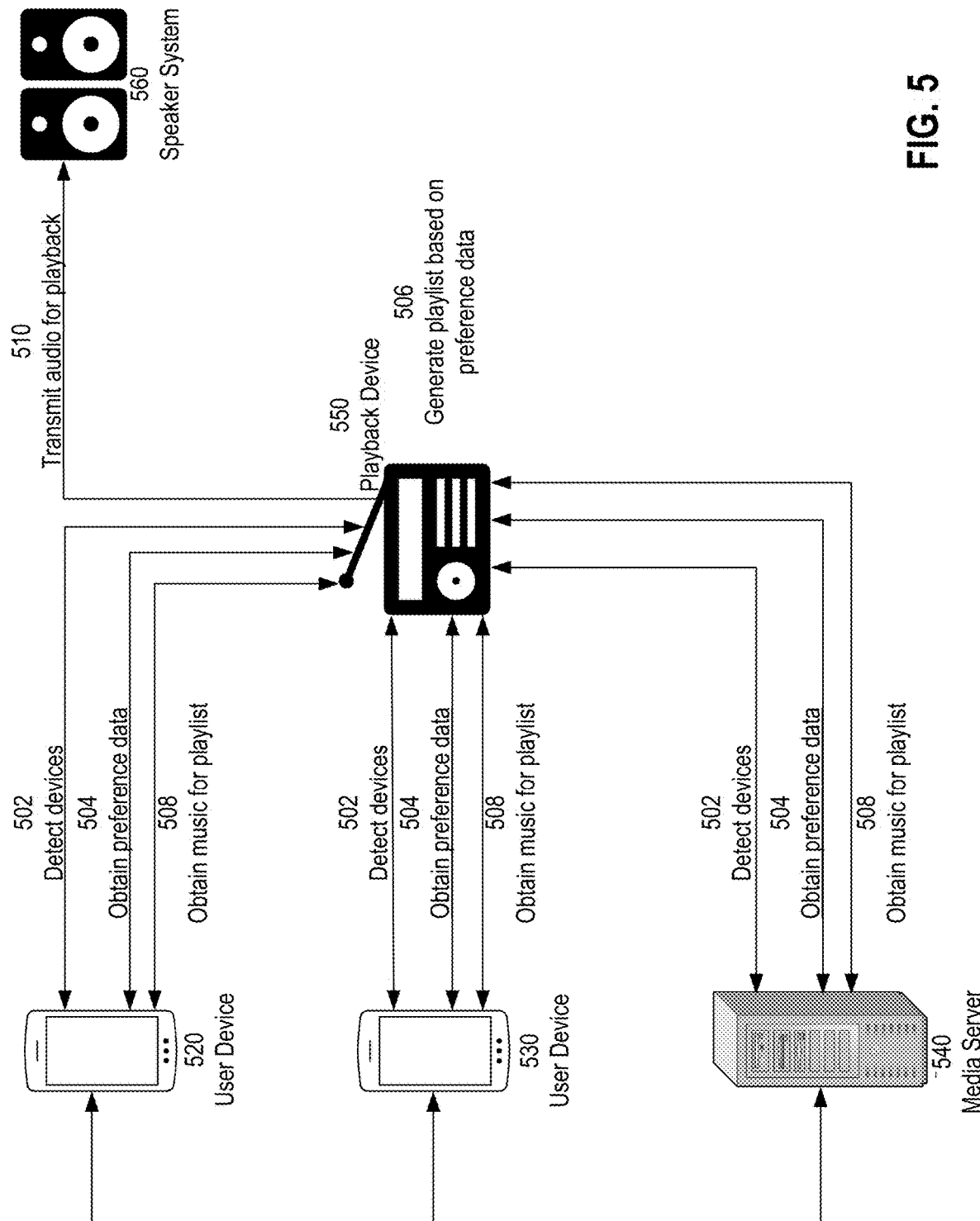
FIG. 5 depicts an example system and method for generating a playlist based on a plurality of device preferences.

FIG. 5 depicts an example system and method for generating a playlist based on a plurality of device preferences. "Device preferences" as used herein refers to music preferences generated through one or more devices, such as through interactions with media applications or music playback. Thus, "device preferences," as used herein, may refer to preferences of a user profile for an application that is installed and/or executed on one or more devices. FIG. 5 depicts user device 520, user device 530, server 540, playback device 550, and speaker system 560. The system of FIG. 5 is depicted to provide an exemplary embodiment of generating a playlist based on a plurality of device preferences, and embodiments may be performed with more or fewer devices. For example, the playback device 550 may comprise a first device for providing audio playback, such as an audio receiver in a vehicle, and a second device for generating the playlist, such as a server computer. As a practical example, a server computer for a rideshare company may perform the steps of detecting devices, obtaining preference data, and generating a playlist. The server computer may then send songs directly to audio receiver and/or cause the audio receiver to request the songs from the one or more devices or server computer. The audio receiver may then transmit the audio for playback to the speaker system.

In other embodiments, the playback device 550 interacts with only the user devices and does not directly communicate with a media server.

User devices 520 and 530 may comprise one or more communication devices configured to communicate with playback device 550 or an external server, such as through a wired or wireless connection. User devices 520 and 530 may comprise a smartphone, laptop computer, tablet, personal digital assistant (PDA), handheld gaming system, or other mobile computing system. User devices 520 and 530 may be configured to store audio files in device storage and/or retrieve audio files over a network from a media server 540.

At step 502, playback device 550 detects devices. Detecting the devices may include identifying devices with a connection to the playback device, such as a Bluetooth connection between the first device 520 and the playback device 550 and between the second device 530 and the playback device 550 or a determination that the first device 520, second device 530, and playback device 550 are connected to a same network, such as a same WiFi network.

Additionally or alternatively, detecting the devices may include receiving data from a server indicating user preferences. For example, a rideshare application may be provided by a server computer to devices 520 and 530 through which a vehicle trip is planned for users of devices 520 and 530. The server computer may detect the user devices by determining that users corresponding to both devices have been assigned to a same vehicle.

In an embodiment, detecting devices comprises obtaining data from a media server 540, which identifies a plurality of user profiles corresponding to a media session. For example, the plurality of devices may communicate with a server that manages a music session for playback device 550. Additionally or alternatively, the playback device may receive direct input from a user with authentication data for a user profile. The playback device may send the authentication data to a media server, which identifies the user profile and provides the playback device with information relating to the user profile, such as preference data.

At step 504, the playback device 550 obtains preference data for the plurality of devices. The playback device 550 may retrieve the preference data directly from the devices and/or from the server 540. For example, the playback device 550 may retrieve data from the plurality of devices identifying music stored on the plurality of devices, music that has been played on the plurality of devices, music that has been accessed over a network by the plurality of devices, such as from a media server, or music for which input has been received at the devices or at other devices corresponding to the devices, such as through a user profile, indicating a preference for the music, such as a "like" in a music streaming application or an addition of the music to a particular playlist. As another example, the playback device 550 may retrieve data from a media server identifying music that has been previously sent to the user devices, sent to devices corresponding to the user devices, or for which input has been received by the user devices or corresponding devices indicating a preference for the music.

At step 506, the playback device 550 generates a playlist based on preference data. For example, the playback device may generate a playlist that includes a plurality of songs that were listed in preferences of each device. The playback device may further add songs to the playlist using one or more rules described further herein with respect to FIG. 6.

At step 508, the playback device obtains the music for the playlist. Obtaining the music may comprise sending a request to one or more of the devices to transmit a stored audio file over a wired or wireless connection to the playback device, sending a request to one or more of the devices to cause the one or more devices to retrieve the audio file from a media server and transmit the audio file over a wired or wireless connection to the playback device, or sending a request to a media server to transmit the audio file to the playback device over one or more networks. Methods for identifying a device from which to request music are described further herein with respect to FIG. 7.

At step 510, the playback device 550 transmits the audio for playback to the speaker system 560. For example, the playback device may send an audio signal to the speaker system to cause the speaker system to play the audio file retrieved in step 508. The playback device 550 may continue to retrieve audio files from the devices and/or media server in accordance with the generated playlist and send the new files to the speaker system 560.

In FIG. 5, multiple options are depicted for performing steps 502, 504, and 508, the options including direct communication with devices and communication with a media server. The different implementations of steps 502, 504, and 508 in FIG. 5 may be performed exclusively or in combination. For example, the playback device 550 may be configured to obtain music for playback from the media server directly, from the devices, or from a combination of devices and media server. As another example, playback device 550 may be configured to obtain device preferences from only the user devices, such as through stored music; only from the media server, such as through music for which input has been received by the media server indicating a preference; or for a combination of the two, such as through identifying both music that is stored on the user device in device data and music that has been streamed to the user device from the media server. As another example, playback device 550 may retrieve preference data from a plurality of different media servers and/or from the devices, which are based on different media servers. Thus, if a first device uses a first application to stream music from a first media server and a second device uses a different application to stream music from a different media server, the playback device 550 may obtain music preferences directly from the different servers or from the devices themselves based on interactions with the different servers.

FIG. 5 depicts an embodiment where the playback device performs steps 502-506. In other embodiments, the detecting devices, obtaining preference data and/or generating the playlist in steps 502-506 are performed by a server that then causes one or more of the devices to send the music to the playback device, causes the playback device to request the music from one or more of the devices, or transmits the music to the playback device.

Additionally, in some embodiments, the playback device may comprise one of the plurality of user devices. For example, a smartphone may execute a playlist application and perform the steps of detecting other devices, obtaining preference data for the other devices as well as preference data for itself; generating the playlist; obtaining the music for the playlist from the other devices, a media server, or storage of the smartphone; and transmitting an audio signal to a speaker system for playback, such as a speaker system of the smartphone or an external speaker system.

FIG. 6 is a flowchart depicting an example method for generating a playlist based on preferences for a plurality of devices.

At step 602, control circuitry of a playback device detects a plurality of devices. For example, the control circuitry of the playback device may cause the playback device to determine a plurality of devices and/or user profiles corresponding to the plurality of devices, such as by detecting devices connected to the playback device through a wired or wireless connection, devices connected to a same network, or through received input indicating which devices to detect, such as through identification of multiple user profiles corresponding to a shared vehicle trip or multiple user profiles that have been authenticated by the playback device or an external server computer.

At step 604, input/output circuitry of the playback device retrieves audio preferences for the devices. For example, input/output circuitry of the playback device may send a request to user devices for preference data, send a request to one or more media servers for preference data, or identify stored preference data for user profiles corresponding to the plurality of devices.

At step 606, control circuitry of the playback device selects a song. For example, control circuitry may initially select a first song indicated as being a preference of one or more of the devices. In some embodiments, the first song selected is a song with a highest preference on the first device, such as a song with a highest number of listens over a particular portion of time. Each time step 606 is performed, control circuitry of the playback device selects a new song that has not previously been selected in this iteration of the method.

At step 608, control circuitry of the playback device determines if the song is listed in device preferences of the plurality of devices. For example, control circuitry may search through device preferences of each other device that had been previously detected for the selected song. The control circuitry of the playback device may be configured to determine that the song is listed in device preferences of the plurality of devices if a search for the song in the device preferences produces a matching result for each of the detected devices.

If control circuitry of the playback device determines that the song is listed in the device preferences of all of the plurality of devices, the process proceeds to step 616, which is described further herein.

If control circuitry of the playback device determines that the song is not listed in the device preferences of all of the plurality of devices, the process proceeds to step 610. At step 610, control circuitry of the playback device determines if there are additional songs to be evaluated for all preferences. If control circuitry determines that there are additional songs to be evaluated for all preferences, the process returns to step 606 and a new song is selected. Thus, the control circuitry of the playback device may repeat steps 606 and 608 for each song in the preferences of one of the devices until a song has been identified that is listed in all preferences or until each song has been evaluated for being listed in all preferences.

If control circuitry of the playback device determines that there are not any additional songs to evaluate for all preferences, at step 612, control circuitry of the playback device determines whether the song should be added based on other rules. In the embodiment of FIG. 6, step 612 is performed only after each song in the preferences of one of the devices has been evaluated with respect to the preferences of all devices. Thus, each song listed in all device preferences is initially added to the playlist with additional songs being added if the playlist is not completed by the time all songs from a device have been evaluated.

In an embodiment, the other rules include a rotating preference rule. The rotating preference rule may specify a rotation of songs selected through different user preferences. For example, the control circuitry of the playback device may be configured to switch between preferences of different devices. Thus, a first song may be selected based on its inclusion in preferences on the first device followed by a second song selected based on its inclusion in preferences of a second device. The rotating preference rule may be based on a number of songs or a length of song. For example, after the second song has been played based on the second set of preferences, the playback device may determine if the total amount of time of music playing from the second preferences exceeds the total amount of time of music playing from the first device preferences. If not, the next song selected may be from the second device preferences. If so, the next song selected may be from the first device preferences.

In an embodiment, the other rules include a timing rule. The timing rule may specify higher priorities for songs based on a length of time users will be proximate to a speaker system. As a practical example, a server computer tracking a vehicle trip may determine that a first user is scheduled to be dropped off in five minutes and a second user is scheduled to be dropped off in fifteen minutes. Based on the timing, the server computer may prioritize playback of music from the first device preferences over playback of music from the second device preferences.

In an embodiment, the other rules include a comparison rule. The comparison rule may specify an order of priorities for comparable songs for selection. For example, at a first pass, the playback device may determine songs from the first device preferences where the exact same song is listed in the second device preferences. At a second pass, the playback device may determine songs from the first device preferences that are in a same album as songs listed in the second device preferences. This process may continue through identifying songs from a same artist, songs from a same genre, and/or songs from a same decade.

If control circuitry of the playback device determines that the song should be added to the playlist based on other rules, the process proceeds to step 616, which is describe further herein.

If control circuitry of the playback device determines that the song should not be added to the playlist based on other rules, the process proceeds to step 614. At step 614, control circuitry of the playback device determines whether there are more songs available. Determining whether more songs are available may include identifying available songs that have not been evaluated with respect to a currently evaluated rule. For example, if all songs have been evaluated for all preferences but only half the songs have been evaluated for similarity in preferences, such as same genre, the playback device may determine that there are more songs available to evaluate with respect to similarity. In some embodiments, the step of determining whether there are more songs available to be evaluated comprises searching through preference data of different devices, thus ensuring that different device music is evaluated.

If control circuitry of the playback device determines that there are no more songs available, the process proceeds to step 620, where the process ends. If control circuitry of the playback device determines that there are more songs available, the process returns to step 606 and a new song is selected.

At step 616, in response to control circuitry of the playback device determining that the song is listed in device preferences of all of the plurality of devices in step 608 or in response to determining that the song should be added to the playlist based on other rules in step 612, control circuitry of the playback device adds the song to the playlist. For example, the control circuitry may store data identifying the selected song and a position in the playlist of the identified song. The control circuitry may additionally stored data indicating which device will provide the song and/or for which device the song was listed in a preference.

At step 618, control circuitry of the playback device determines whether the playlist is complete. For example, control circuitry of the playback device may store a threshold value for a playlist limit, such as a maximum number of songs or a maximum amount of time. Additionally or alternatively, the control circuitry of the playback device may determine the limit based on received timing data. For example, if a vehicle trip is predicted to last only fifteen minutes, the control circuitry of the playback device may continue to add songs until the limit of fifteen minutes has been exceeded. If the control circuitry of the playback device determines that the limit has been exceeded, the control circuitry of the playback device may determine that the playlist is complete.

If control circuitry of the playback device determines that the playlist is not complete, the process proceeds to step 614 and control circuitry of the playback device determines if more songs are available as described previously herein. If control circuitry of the playback device determines that the playlist is complete, then the process proceeds to step 620. At step 620, the process ends and the playlist is stored for use.

As noted with respect to FIG. 5, embodiments of FIG. 6 may be performed with the playback device and one of the user devices comprising the same device and/or with the playback device including an external server computer. Additionally, although two devices are depicted in FIG. 6, the methods described herein may be performed with a greater number of devices, such that music is selected initially if listed in the preferences of all devices followed by a trade-off between additional devices. Additionally or alternatively, preference rules may correspond to a number of devices that list a song as a preference. For example, the playback device may additionally search for songs listed in all preferences followed by songs listed in all but one of the preferences. In such a method, the playback device may be configured to weight the value of a device's preferences higher based on how long it has been since a song was played from the device's preferences and/or based on timing information as described above. Thus, if out of six devices, a large number of songs are listed in the preferences of a particular five of the devices, each time a song is played from the preferences of the particular five of the devices, the weight of the preference of the sixth device increases. Thus, future songs will be more likely to be played that the sixth device has listed in its preferences.

FIG. 7 is a flowchart depicting an example method for selecting a device to play back a song on a playlist. The method of FIG. 7 may be performed in conjunction with the playlist selection of FIGS. 4-6 to select a device for playing a next song of the playlist or the broadcast transition method of FIGS. 1-3 to select a device to transition to from the FM broadcast. The method of FIG. 7 may additionally be performed in conjunction with other methods of determining playback of music from a plurality of devices, such as when a playlist has previously been created.

At step 702, control circuitry of a playback device identifies a new song to play. The new song to play may comprise a song determined based on a current broadcast or a next song on a stored playlist. Additionally or alternatively, the song may be selected from explicit input selecting the song to play, such as through a media application of one of the devices. Additionally or alternatively, the song may be selected from user input into a graphical user interface of the playback device, such as a touchscreen panel of an audio receiver. The playback device or media application may provide functionality to search through music stored or accessible to a plurality of devices, thereby allowing selection of a song that can be played through at least one of the devices.

At step 704, control circuitry of the playback device identifies a new device. For example, control circuitry of the playback device may identify a device that is communicatively coupled to the playback device, such as through a wired or wireless connection.

At step 706, control circuitry of the playback device determines whether the identified device is capable of providing the song. For example, control circuitry of the playback device may determine whether an audio file of the song is stored on the playback device. Additionally or alternatively, control circuitry of the playback device may communicate with an application on the user device through an API to determine if the user device is capable of retrieving the song through the application.

If control circuitry of the playback device determines that the identified device cannot provide the song, then the process proceeds to step 714, which is described further herein.

If control circuitry of the playback device determines that the identified device can provide the song, then the process proceeds to step 708. At step 708 control circuitry of the playback device determines whether the identified device is more optimal for providing the song than a currently selected device. For example, a song may be set as "selected" in step 718 using the method described herein. If no device has been set as "selected" then at step 708 the identified device is determined to be more optimal than the currently selected device.

Control circuitry of the playback device may be configured to determine that a device is more optimal for providing a song based on a quality of an audio file of the song. For example, control circuitry of the playback device may determine whether an audio file of the song is available in a higher quality from the identified device than the selected device, such as through a stored file or access to media through a different application. The device with the higher audio quality may be determined to be optimal for providing the song. If both devices have access to the same audio quality, the control circuitry may determine if either of the devices is more optimal based on other factors or determine that the identified device is not more optimal for providing the song.

Control circuitry of the playback device may be configured to determine that a device is more optimal for providing a song based on a connection strength of the device. For example, if a connection strength of the identified device is lower than a stored threshold value, the control circuitry of the playback device may determine that the device is not more optimal for providing the song. If both devices have a connection strength higher than the threshold value or both have a connection strength lower than the threshold value, the control circuitry may determine if either of the devices is more optimal based on other factors or determine that the identified device is not more optimal for providing the song.

Control circuitry of the playback device may be configured to determine that a device is more optimal for providing a song based on factors that affect playback quality of the song. For example, the control circuitry of the playback device may determine whether the song is only available on the identified device from an application that limits song playbacks or requires the playing of an advertisement to play the song. If the identified device is subject to such restrictions through a media source and there are no other more optimal avenues through which the device can provide the song, the control circuitry may determine that the device is not optimal for providing the song. If both devices are capable of providing the song without any factors that reduce playback quality or both devices include the same restrictions, the control circuitry may determine if either of the devices is more optimal based on other factors or determine that the identified device is not more optimal for providing the song.

Control circuitry of the playback device may be configured to determine that a device is more optimal for providing a song based on data limits for the plurality of devices. For example, the control circuitry may determine whether the identified device is subject to data restrictions or additional data costs. Control circuitry of the playback device may determine that devices that are subject to data restrictions or additional data costs are not optimal for providing the song. If both devices are not subject to data restrictions or additional costs or both devices are subject to data restrictions or additional costs, the control circuitry may determine if either of the devices is more optimal based on other factors or determine that the identified device is not more optimal for providing the song.

If control circuitry of the playback device determines that the identified device is more optimal for providing the song than the currently selected device, the process proceeds to step 718 which is described further herein. If the control circuitry determines that the identified device is not more optimal for providing the song than the currently selected song, the process proceeds to step 710.

At step 710, control circuitry of the playback device determines whether the identified device is less optimal for providing the song than the currently selected device. For example, a device may be set as "selected" in step 718 using the method described herein. The playback device may determine whether the selected device is more optimal for providing the song based on one or more of the above factors, such as whether the selected device has fewer data restrictions, higher battery life, fewer factors that reduce playback quality, and/or higher signal strength. Additionally or alternatively, determining whether the selected device is more optimal than the identified device may comprise executing any of the above rules with the selected device and identified device reversed. Thus, while two devices may have different battery life, neither device may be identified as optimal if both devices have a battery life above the threshold value.

If control circuitry of the playback device determines that the identified device is less optimal for providing the song than the currently selected device, the process proceeds to step 714, which is described further herein.

If control circuitry of the playback device determines that the identified device is not less optimal for providing the song than the currently selected device, the process proceeds to step 712. At step 712, control circuitry of the playback device determines whether the identified device should be selected based on other considerations. Other considerations may include timing considerations or trade-off considerations.

A timing consideration may comprise one or more rules that cause a device to be selected or not selected based on timing information, such as an amount of time prior to a user of the device reaching a destination. If the user of the selected device is predicted to reach a destination prior to the user of the identified device, the control circuitry of the playback device may determine that the identified device should be selected based on the timing consideration, thereby ensuring that the song will finish playing after one of the devices disconnects from the playback device.

A trade-off consideration may comprise one or more rules that specify an order in which devices should be selected when multiple devices are equally optimal for playing back the song. For example, the control circuitry may be configured to switch between devices for requesting music to split streaming burdens on data usage or battery between multiple devices. Thus, if the selected device played a song more recently than the identified device, the control circuitry of the playback device may determine that the identified device should be selected based on the trade-off consideration.

If control circuitry of the playback device determines that the identified device should be selected based on other considerations, then the process proceeds to step 718 which is described further herein.

If control circuitry of the playback device determines that the identified device should not be selected based on other considerations, the process proceeds to step 714. At step 714, control circuitry of the playback device determines whether there are other devices available. For example, control circuitry of the playback device may perform the method of FIG. 7 with each of a plurality of devices. If control circuitry of the playback device determines that there are other devices available, the process returns to step 706 and a new device is identified, thereby causing the new device to be evaluated against the selected device.

If control circuitry of the playback device determines that there are no other devices available, the process proceeds to step 716. At step 716, input/output circuitry of the playback device retrieves the song based on the selected device. For example, the input/output circuitry of the playback device may send a request to the selected device to retrieve audio data for the song and transmit the audio data to the playback device. In an embodiment, input/output circuitry generates the request prior to completion of a prior song, thereby allowing the selected device to buffer at least a first portion of the song. In some embodiments, input/output circuitry further requests that the device playing the current song buffer a first portion of the next song. The playback device may playback the first portion of the next song during the time it takes for the second device to connect and begin transmitting the second song. In an embodiment, the first device detects that the second device has successfully connected to the playback device, such as through a message (e.g., an acknowledgement) sent from the playback device, and, in response, pauses playback and flushes a content buffer comprising the first portion of the next song.

At step 718, in response to determining the identified device is more optimal for providing the song than the currently selected device in step 708 or in response to determine that the identified device should be selected based on other considerations in step 712, control circuitry of the playback device sets the identified device as the selected device. The newly selected device may then be evaluated against additional devices or, if additional devices are not available, be used to retrieve the song through the continuation of the process to step 714 as described previously herein.

Example Implementation: Hardware and Software Overview

Figure 8:
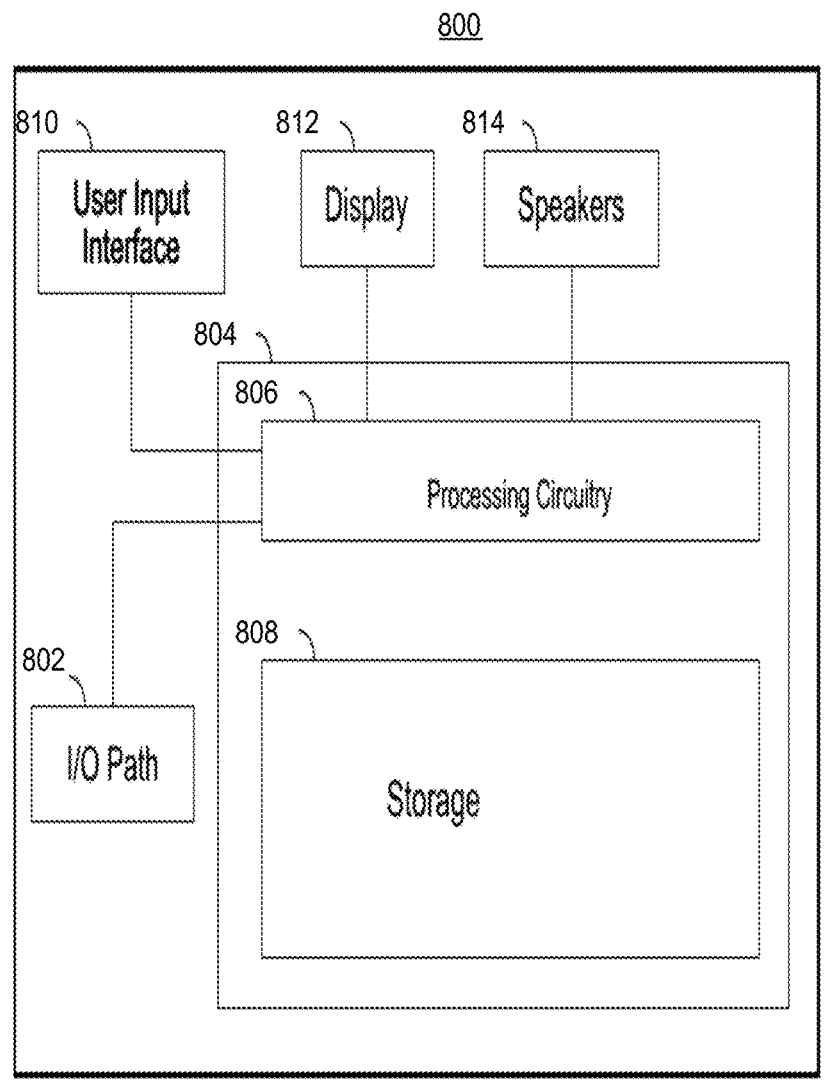
FIG. 8 depicts a block diagram of an illustrative user device, in accordance with some embodiments of the disclosure.

FIG. 8 depicts a generalized embodiment of an illustrative device (e.g., playback device or server computer) that performs methods of transitioning between radio broadcast and device music, generating curated playlists, and/or selected devices for media playback. Device 800 may be any of a plurality of user devices such as a smartphone, a tablet, personal computer, set-top box, server computer, audio receiver device, etc. (discussed further below with respect to FIG. 9). Device 800 may receive the radio transmissions, audio files, and/or device preferences through input/output (hereinafter "I/O") path 802. I/O path 802 may provide audio data, device preferences, and/or device data to control circuitry 804, which includes processing circuitry 806 and storage 808. Control circuitry 804 may be used to send and receive commands, requests, and other suitable data using I/O path 802. I/O path 802 may connect control circuitry 804 (and specifically processing circuitry 806) to one or more communications paths (described below in relation to FIG. 9). I/O functions may be provided by one or more of these communications paths but are shown as a single path in FIG. 8 to avoid overcomplicating the drawing.

Control circuitry 804 may be based on any suitable processing circuitry such as processing circuitry 806. Processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., quad-core). In some embodiments, processing circuitry may be distributed across multiple separate processor or processing units, for example, multiple of the same type of processing units (e.g., two Intel Core i7 processors) or multiple different processors (e.g., Ryzen processor with integrated CPU and GPU processing cores) or may include a multi-core processor (e.g., dual-core, quad-core, hexa-core, or any suitable number of cores) or supercomputer. In some embodiments, control circuitry 804 executes instructions for an application stored in memory (e.g., memory 808). In some implementations, any action performed by control circuitry 804 may be based on instructions received from an application executing on device 800.

The circuitry described herein, including, for example, tuning, audio generating, encoding, decoding, encrypting, decrypting, scaler, and analog/digital circuitry, may be implemented using software running on one or more general purpose or specialized processors. If storage 808 is provided as a separate device from user equipment device 800, the tuning and encoding circuitry may be associated with storage 808.

Storage 808 may be any device for storing electronic data, such as random-access memory, solid state devices, quantum storage devices, hard disk drives, non-volatile memory or any other suitable fixed or removable storage devices, and/or any combination of the same. Control circuitry 804 may allocate portions of storage 808 for various purposes such as caching application instructions, recording media assets, storing portions of a media asset, buffering segments of media, etc. As described herein, storage 808 may be used to store one or more LUTs storing a number of MAC addresses associated with a plurality of user equipment devices and their corresponding profile information.

A user may send instructions to control circuitry 804 using user input interface 810. User input interface 810 may be any suitable user input interface, such as a remote control, mouse, trackball, keypad, keyboard, touchscreen, touchpad, stylus input, joystick, voice recognition interface, or other user input interfaces. Instructions to control circuitry 804 may be transmitted through I/O path 802, which could consist of a video tracking and detection mechanism, Internet of Things (IoT) and home automation triggers, emergency alert systems, and software or hardware communication pipelines and/or notification centers.

Display 812 may be provided as a stand-alone device or integrated with other elements of each one of user equipment device 800. For example, display 812 may be a touchscreen or touch-sensitive display, a projector, or a casting device. In such circumstances, user input interface 810 may be integrated with or combined with display 812. Display 812 may be one or more of a monitor, a television, a liquid-crystal display (LCD) for a mobile device, silicon display, e-ink display, light-emitting diode (LED) display, or any other suitable equipment for displaying visual images. Graphics processing circuitry may generate the output to the display 812. In some embodiments, the graphics processing circuitry may be external to processing circuitry 806 (e.g., as a graphics processing card that communicates with processing circuitry 806 via I/O path 802) or may be internal to processing circuitry 806 or control circuitry 804 (e.g., on a same silicone die as control circuitry 804 or processing circuitry 806). In some embodiments, the graphics processing circuitry may be used to receive, display, and play content.

Speakers 814 may be provided as integrated with other elements of user equipment device 800 or may be stand-alone units. The audio component of videos and other content displayed on display 812 may be played through speakers 814. In some embodiments, the audio may be distributed to a receiver (not shown), which processes and outputs the audio via speakers 814. The speakers 814 may be part of, but not limited to, a home automation system.

Streaming applications may be, for example, stand-alone applications implemented on user devices. For example, the streaming application may be implemented as software or a set of executable instructions, which may be stored in non-transitory storage 808 and executed by control circuitry 804 of a user device 902, 904, 906. In such an approach, instructions of the streaming application are stored locally (e.g., in storage 808), and data for use by the application is downloaded on a periodic basis (e.g., from an out-of-band feed, from an Internet resource, or using another suitable approach). Control circuitry 804 may retrieve instructions of the streaming application from storage 808 and process the instructions to generate any of the displays discussed herein. Based on the processed instructions, control circuitry 804 may determine what action to perform when user input is received from input interface 810.

Figure 9:
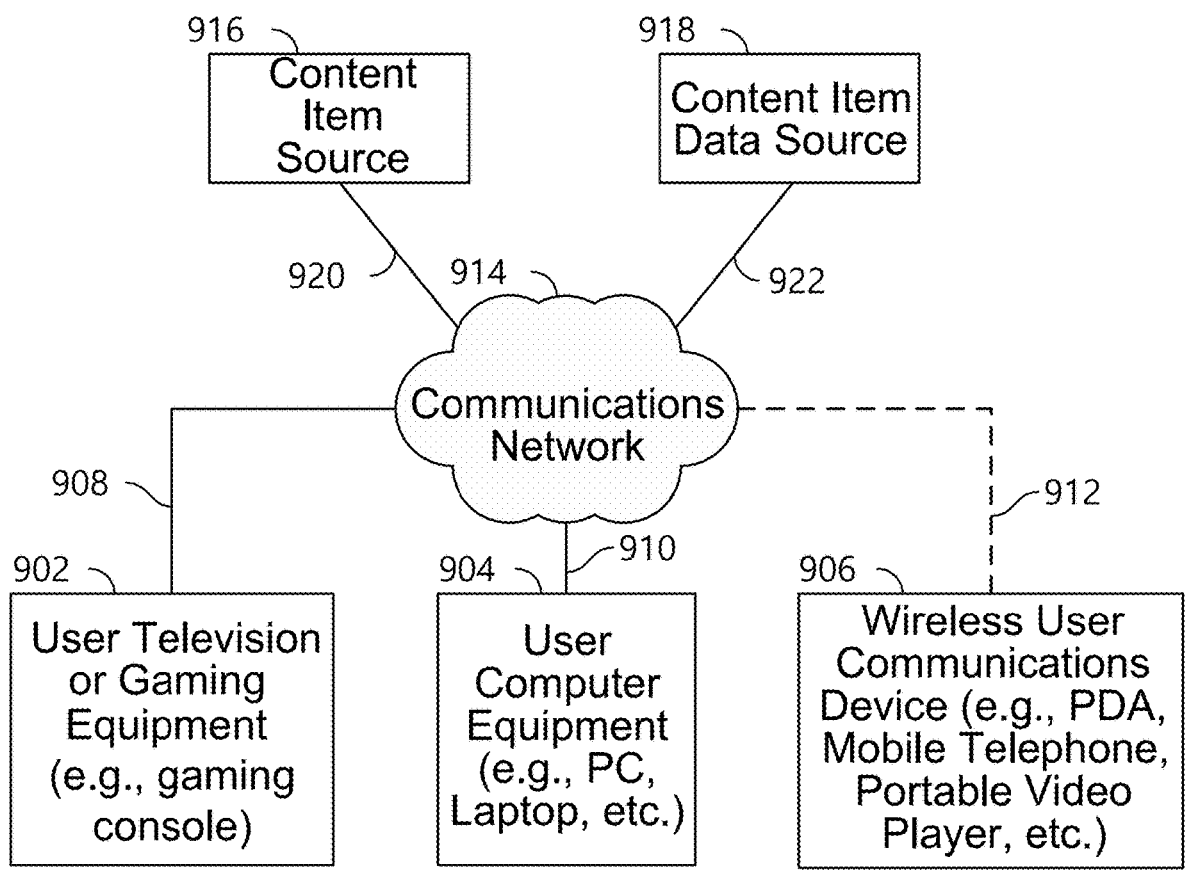
FIG. 9 depicts a block diagram of an illustrative media system, in accordance with some embodiments of the disclosure.

FIG. 9 depicts an exemplary media system in accordance with some embodiments of the disclosure, in which user equipment device 88A, 88B, 88C, and user equipment device 800 can be implemented in the media system 900 of FIG. 9 as user television equipment 902, user computer equipment 904, wireless user communications device 906, or any other type of user equipment suitable for accessing media. For simplicity, these devices may be referred to herein collectively as user equipment or a user device. User equipment, on which the media application or the streaming application is implemented, may function as a stand-alone device or may be part of a network of devices. Various network configurations of devices may be implemented and are discussed in more detail below.

User television equipment 902 may include a set-top box, an integrated receiver decoder (IRD) for handling satellite television, a television set, a digital storage device, or other user television equipment. One or more of these devices may be integrated to be a single device, if desired. User computer equipment 904 may include a PC, a laptop, a streaming content aggregator, a PC media center, or other user computer equipment. It may include devices like digital assistance, smart speakers, and/or home automation. Wireless user communications device 906 may include a smartphone, a portable video player, a portable music player, a portable gaming machine, a tablet, a wireless streaming device or other wireless device. It should be noted that the lines are blurred when trying to classify a device as one of the above devices and one device may be categorized into one or more of the categories listed above.

In system 900, there are typically more than one of each type of user equipment, but only one of each is shown in FIG. 9 to avoid overcomplicating the drawing. In addition, each user may utilize more than one type of user equipment (e.g., a user may have a computer and a tablet) and also more than one of each type of user equipment device (e.g., a user may have multiple television sets).

The user equipment may be coupled to communications network 914. Namely, user television equipment 902, user computer equipment 904, and wireless user communications device 906 are coupled to communications network 914 via communications paths 908, 910, and 912, respectively. Communications network 914 is used by the user equipment to obtain the video stream. Communications network 914 may be one or more networks including the Internet, a mobile phone network, ad-hoc network, or other types of communications network or combination of communications networks. Paths 908, 910, and 912 may separately or together include one or more communications paths, including any suitable wireless communications path. Path 912 is drawn as a dotted line to indicate it is a wireless path. Communications with the user equipment may be provided by one or more of these communications paths but are shown as a single path in FIG. 9 to avoid overcomplicating the drawing. The user equipment devices may communicate with each other directly through an indirect path via communications network 914.

System 900 includes content item source 916 and content item data source 918 coupled to communications network 914 via communications paths 920 and 922, respectively. Paths 920 and 922 may include any of the communications paths described above in connection with paths 908, 910, and 912. Communications with the content item source 916 and content item data source 918 may be exchanged over one or more communications paths but are shown as a single path in FIG. 9 to avoid overcomplicating the drawing. In addition, there may be more than one of each of content item source 916 and content item data source 918, but only one of each is shown in FIG. 9 to avoid overcomplicating the drawing. In some embodiments, content item source 916 and content item data source 918 are integrated as one source device. Although communications between sources 916 and 918 with user equipment are shown as through communications network 914, in some embodiments, sources 916 and 918 may communicate directly with user equipment devices 902, 904, and 906 via communications paths (not shown) such as those described above in connection with paths 908, 910, and 912.

Content item source 916 or content item data source 918 may include one or more types of media distribution equipment such as a media server, cable system headend, satellite distribution facility, intermediate distribution facilities and/or servers, Internet providers, on-demand media servers, and other media providers. Content item source 916 or content item data source 918 may be the originator of media content or may not be the originator of media content. Content item source 916 or content item data source 918 may also include a remote media server used to store different types of media content (including a media asset selected by a user), in a location remote from any of the user equipment. Systems and methods for providing remotely stored media to user equipment are discussed in greater detail in connection with Ellis et al., U.S. Pat. No. 7,761,892, issued Jul. 20, 2010, which is hereby incorporated by reference herein in its entirety.

System 900 is intended to illustrate a number of approaches, or network configurations, by which user equipment devices and sources of media content and guidance data may communicate with each other for the purpose of accessing media and data related to the media. The configuration of the devices and paths in system 900 may change without departing from the scope of the present disclosure.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods. For example, processes 800, 900 and 1300 can be performed on any of the devices shown in FIGS. 8-15. Additionally, any of the steps in processes 800, 900 and 1300 can be performed in any order, can be omitted, and/or can be combined with any of the steps from any other process.

What is claimed is:

1. A method comprising:
receiving a media broadcast at a first device and causing play of the media broadcast;
identifying a first media item in the media broadcast and a first play timestamp of the first media item;
identifying a second device communicatively coupled to the first device;
based on the first media item, identifying a second media item to which the second device has access through one or more of second device storage or an application executing on the second device, such that the second media item and the first media item represent the same media content, and, in response, sending a request to the second device for the second media item;
determining, as a delay time length, a length of a delay until play of the second media item via the second device;
determining a second play timestamp as a time in the first media item that is the determined delay time length after the first play timestamp; and
causing transition to the play of the second media item according to the second play timestamp.

2. The method of claim 1, further comprising:
storing data identifying a plurality of transition timestamps in the second media item;
determining that the second play timestamp is a closest previous transition timestamp of the plurality of transition timestamps to the first play timestamp and, in response, determining the first play timestamp.

3. The method of claim 1, wherein:
identifying the first media item comprises:
accessing a broadcast listing indicating times when various media items will be played on the media broadcast;
accessing data identifying a first length of time of the first media item;
determining that a current time is within the identified first length of time from a time when the first media item was scheduled to be played on the media broadcast;
identifying the first play timestamp comprises identifying a second length of time from the time when the first media item was scheduled to be played until the current time and selecting the first play timestamp based, at least in part, on the second length of time.

4. The method of claim 1, further comprising determining the second play timestamp by comparing an audio wave of the first media item with an audio wave of the second media item.

5. The method of claim 1, wherein identifying the first play timestamp comprises identifying a timestamp when the first device stopped play of the first media item.

6. The method of claim 1, further comprising:
causing displaying, on a graphical user interface, one or more options for performing a trick play action with respect to the first media item;
receiving a selection of a particular option of the one or more options and, in response, causing transitioning from playing the first media item from the media broadcast to playing the second media item from the second device.

7. The method of claim 1, further comprising:
determining a quality of the media broadcast;
causing transitioning from playing the first media item from the media broadcast to playing the second media item from the second device in response to determining that the quality is below a threshold value.

8. The method of claim 7, wherein the quality comprises one or more of an audio quality or a signal quality.

9. The method of claim 1, further comprising:
determining that the second media item has been completed and, in response, causing transition back to playing media the media broadcast.

10. A system comprising:
input/output circuitry configured to receive a media broadcast; and
control circuitry configured to:
cause play of the media broadcast;
identify a first media item in the media broadcast and a first play timestamp of the first media item;
identify a user device communicatively coupled to the system;
based on the first media item, identify a second media item to which the user device has access through one or more of user device storage or an application executing on the user device, such that the second media item and the first media item represent the same media content;
wherein the input/output circuitry is further configured to, in response to the control circuitry identifying the second media item, send a request to the user device for the second media item and receive the first media item from the user device;
wherein the control circuitry is further configured:
to determine, as a delay time length, a length of a delay until play of the second media item on the user device;
to determine a second play timestamp as a time in the first media item that is the determined delay time length after the first play timestamp; and
to cause a transition to the play of the second media item on the user device according to the second play timestamp.

11. The system of claim 10, wherein the control circuitry is further configured to:
store data identifying a plurality of transition timestamps in the second media item, wherein the second media item and the first media item comprise same media;
determine that the second play timestamp is a closest previous transition timestamp of the plurality of transition timestamps to the first play timestamp and, in response, determining the first play timestamp.

12. The system of claim 10, wherein:
when identifying the first media item, the control circuitry is further configured to:
access a broadcast listing indicating times when different media items will be played on the media broadcast;
access data identifying a first length of time of the first media item;
determine that a current time is within the identified first length of time from a time when the first media item was scheduled to be played on the media broadcast;
when identifying the first play timestamp, the control circuitry is further configured to identify a second length of time from the time when the first media item was scheduled to be played until the current time and select the first play timestamp based, at least in part, on the second length of time.

13. The system of claim 10, wherein, when identifying the first play timestamp, the control circuitry is further configured to identify a timestamp when the first device stopped play of the first media item.

14. The system of claim 10, wherein the control circuitry is further configured to:
cause displaying, on a graphical user interface, one or more options for performing a trick play action with respect to the first media item;
receive a selection of a particular option of the one or more options and, in response, cause transitioning from playing the first media item from the media broadcast to playing the second media item from the user device.

15. The system of claim 10, wherein the control circuitry is further configured to determine a quality of the media broadcast;
cause transitioning from playing the first media item from the media broadcast to playing the second media item from the user device in response to determining that the quality is below a threshold value.

16. The system of claim 15, wherein the quality comprises one or more of an audio quality or a signal quality.

17. The system of claim 10, wherein the control circuitry is further configured to:
determine that the second media item has been completed and, in response, causing transition back to playing media the media broadcast.

* * * * *